US008988664B2

(12) United States Patent
Suzuki et al.

(10) Patent No.: US 8,988,664 B2
(45) Date of Patent: Mar. 24, 2015

(54) DISTANCE MEASURING DEVICE

(71) Applicants: Shuichi Suzuki, Kanagawa (JP);
Mitsuru Nakajima, Kanagawa (JP);
Kenichi Yoshimura, Kanagawa (JP)

(72) Inventors: Shuichi Suzuki, Kanagawa (JP);
Mitsuru Nakajima, Kanagawa (JP);
Kenichi Yoshimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 56 days.

(21) Appl. No.: 13/771,465

(22) Filed: Feb. 20, 2013

(65) Prior Publication Data

US 2013/0229645 A1  Sep. 5, 2013

(30) Foreign Application Priority Data

Feb. 22, 2012  (JP) ................................. 2012-035839

(51) Int. Cl.
*G01S 17/02* (2006.01)
*G01S 17/10* (2006.01)
*G01S 7/481* (2006.01)

(52) U.S. Cl.
CPC ................. *G01S 17/02* (2013.01); *G01S 17/10* (2013.01); *G01S 7/4811* (2013.01); *G01S 7/4817* (2013.01)
USPC .......... 356/5.01; 356/3.01; 356/4.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,808,727 A | 9/1998 | Katayama | |
| 7,382,442 B2 | 6/2008 | Adachi et al. | |
| 2011/0255070 A1* | 10/2011 | Phillips et al. | 356/4.01 |
| 2012/0221142 A1* | 8/2012 | Doak | 700/223 |

FOREIGN PATENT DOCUMENTS

| | | |
|---|---|---|
| AT | 509 180 A1 | 6/2011 |
| EP | 1 253 440 A1 | 10/2002 |
| JP | 07-084045 | 3/1995 |
| JP | 10-132934 | 5/1998 |

(Continued)

OTHER PUBLICATIONS

U.S. Appl. No. 13/622,583, filed Sep. 19, 2012, Shuichi Suzuki et al.

(Continued)

*Primary Examiner* — Luke Ratcliffe
(74) *Attorney, Agent, or Firm* — Oblon, McClelland, Maier & Neustadt, L.L.P.

(57) ABSTRACT

Disclosed is a distance measuring device configured to irradiate an object with light and receive reflected light therefrom to measure a distance from the object, including a light source device having at least one light-emitting part, a deflection part being provided rotatably around a predetermined axis line and having plural deflection faces configured to reflect light from the light source device toward the object, a reflection part being provided rotatably around the axis line and integrally with the deflection part and having plural reflection faces being provided to correspond to the plural deflection faces individually and reflecting a portion of light reflected from a corresponding deflection face and reflected from the object, and a light-receiving part having at least one light-receiving element configured to receive light reflected from the reflection part, wherein respective inclination angles of the plural deflection faces with respect to the axis line are mutually different.

14 Claims, 29 Drawing Sheets

(56) References Cited

FOREIGN PATENT DOCUMENTS

| JP | 2005-291787 | 10/2005 |
|----|-------------|---------|
| JP | 2009-145107 | 7/2009 |
| WO | WO 98/16801 | 4/1998 |

OTHER PUBLICATIONS

U.S. Appl. No. 13/650,382, filed Oct. 12, 2012, Tetsuya Ogata et al.
The Extended European Search Report issued Jun. 3, 2013, in Application No. / Patent No. 13156086.4-1812.

* cited by examiner

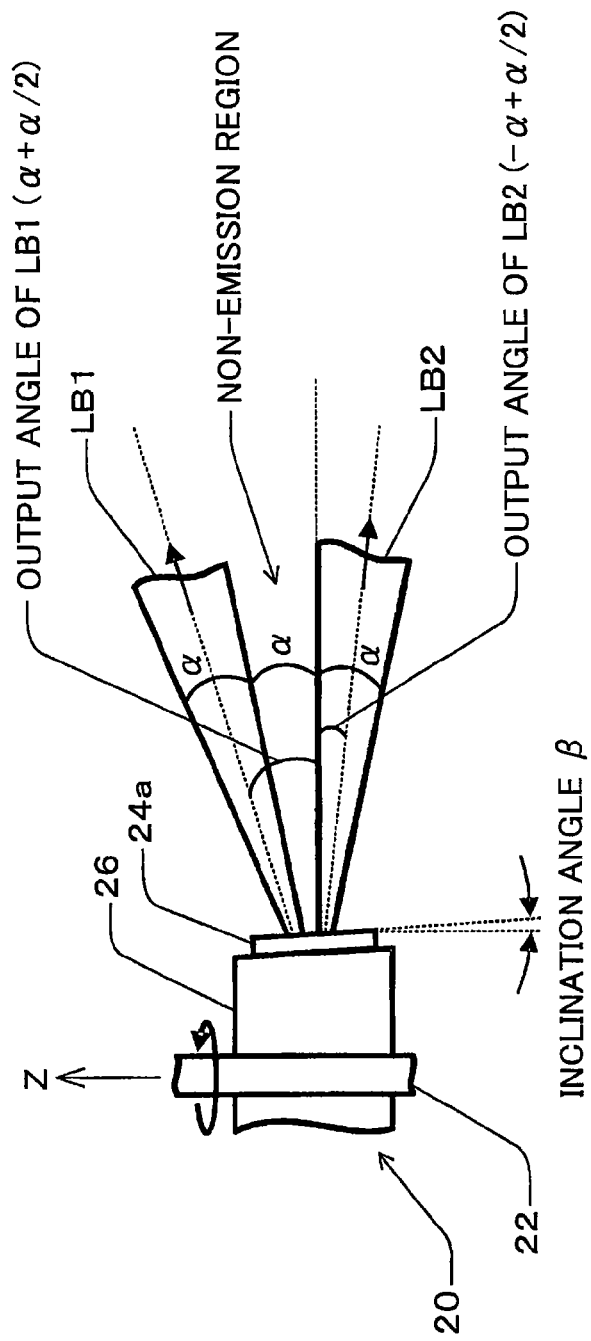

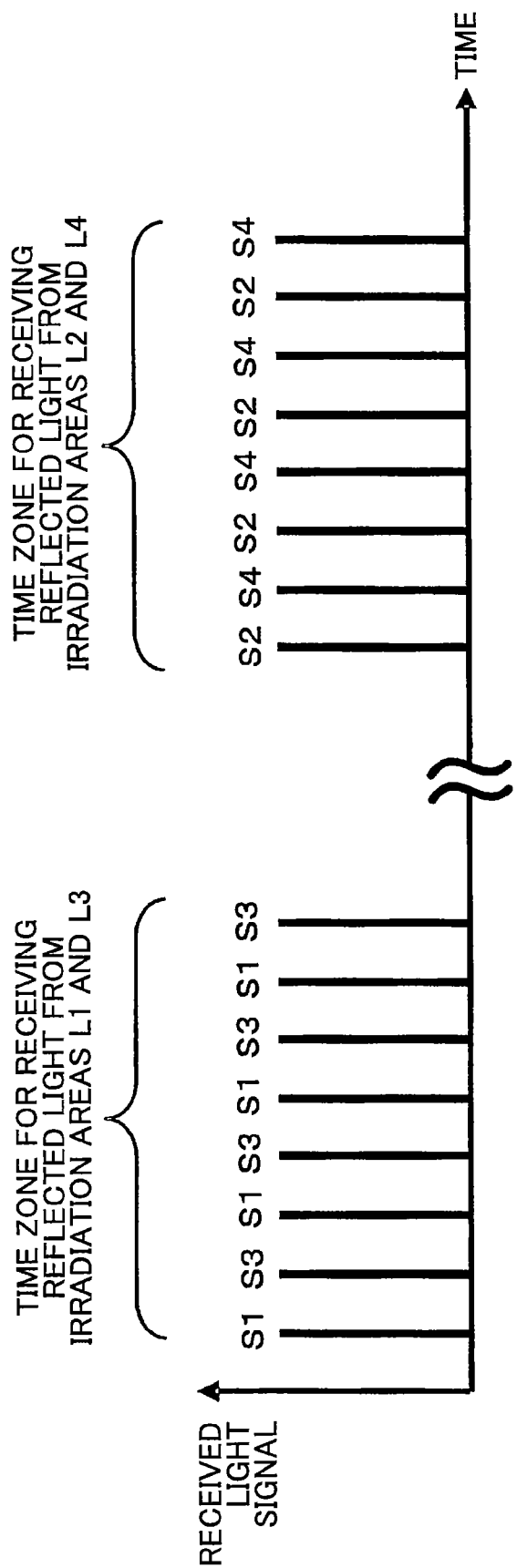

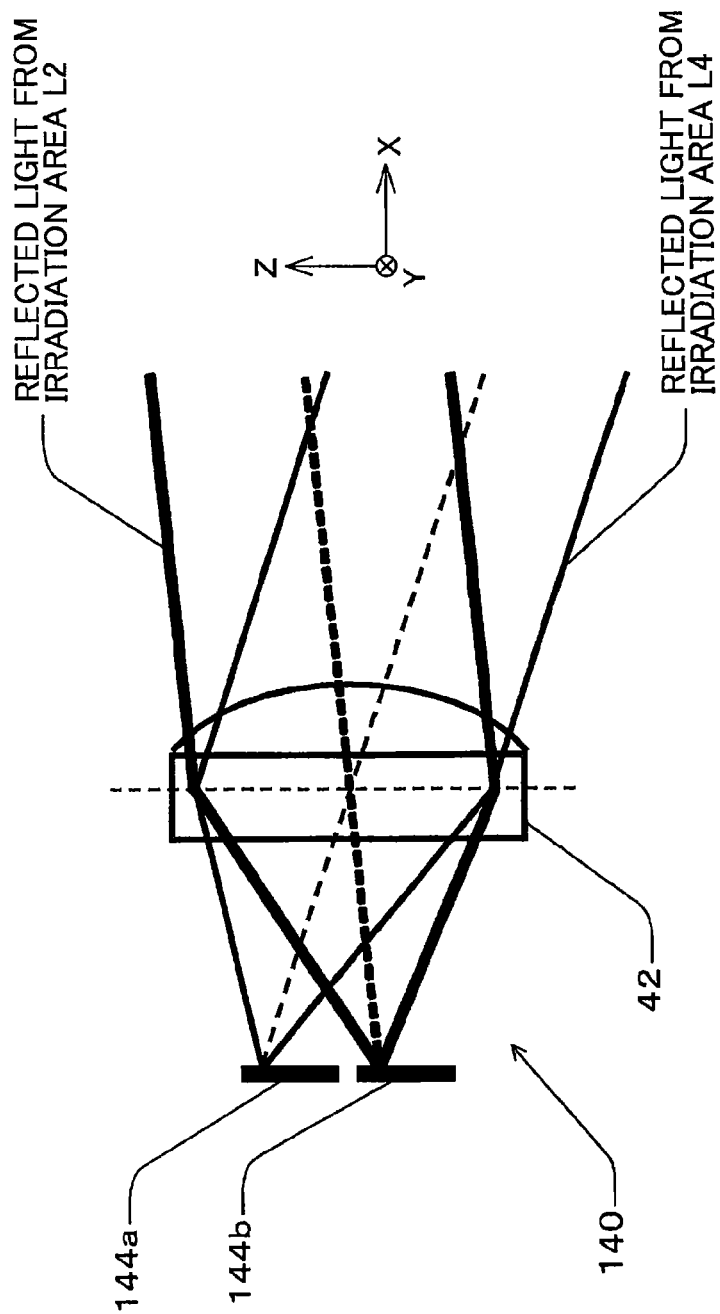

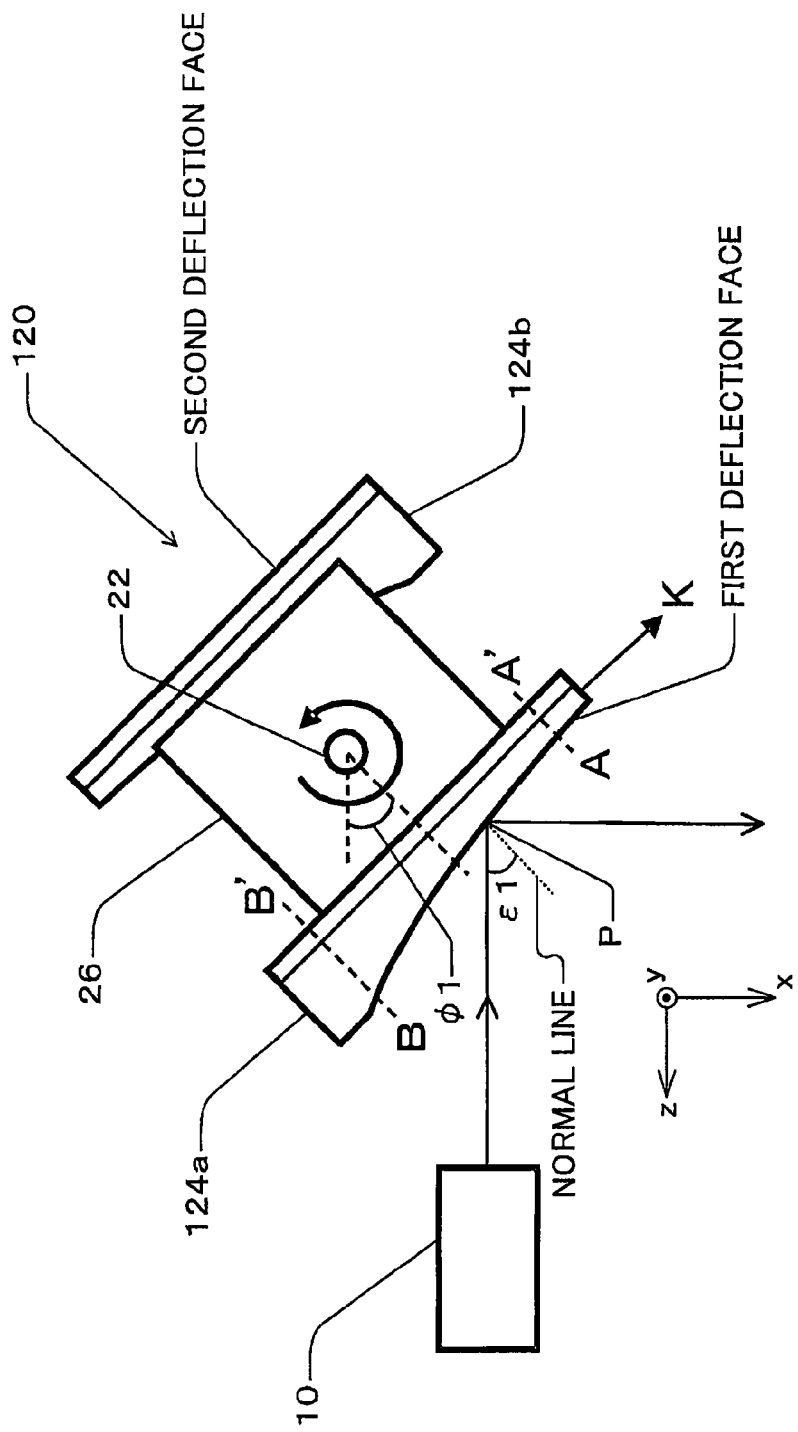

DISTANCE MEASURING DEVICE

BACKGROUND OF THE INVENTION

1. Field of the Invention

An aspect of the present invention relates to a distance measuring device.

2. Description of the Related Art

Conventionally, a laser radar device has been known for irradiating plural places on a surface of an object with light from a laser diode via a mirror unit having a swing mirror capable of swinging around a first axis and a second axis which are mutually orthogonal and plural mirrors with different tilt angles with respect to a third axis orthogonal to the first axis, and for receiving reflected light from each of the plural places on a photodiode via the mirror unit, so that distances from the plural places are measured for a short time (for example, see Japanese Patent Application Publication No. 2009-145107).

However, in a laser radar device as disclosed in Japanese Patent Application Publication No. 2009-145107, a configuration and control of such a device may be complicated causing a higher cost to be provided.

SUMMARY OF THE INVENTION

According to one aspect of the present invention, there is provided a distance measuring device configured to irradiate an object with light and receive reflected light therefrom to measure a distance from the object, including a light source device having at least one light-emitting part, a deflection part being provided rotatably around a predetermined axis line and having plural deflection faces configured to reflect light from the light source device toward the object, a reflection part being provided rotatably around the axis line and integrally with the deflection part and having plural reflection faces being provided to correspond to the plural deflection faces individually and reflecting a portion of light reflected from a corresponding deflection face and reflected from the object, and a light-receiving part having at least one light-receiving element configured to receive light reflected from the reflection part, wherein respective inclination angles of the plural deflection faces with respect to the axis line are mutually different.

BRIEF DESCRIPTION OF THE DRAWINGS

FIG. 6A is a diagram illustrating output angles and spread angles of two laser light beams deflected by a first deflection mirror of a deflector with respect to a direction of a Z-axis and FIG. 6B is a diagram illustrating output angles and spread angles of two laser light beams deflected by a second deflection mirror of a deflector with respect to a direction of a Z-axis.

FIG. 11 is a timing chart illustrating timing of output of a received light signal from a light-receiving element of a light-receiving part.

FIG. 13A and FIG. 13B are diagrams (part 1 and part 2) illustrating a light-receiving element in a second embodiment.

FIG. 15A and FIG. 15B are diagrams illustrating a deflector in a third embodiment.

DETAILED DESCRIPTION OF THE PREFERRED EMBODIMENTS

Figure 1:
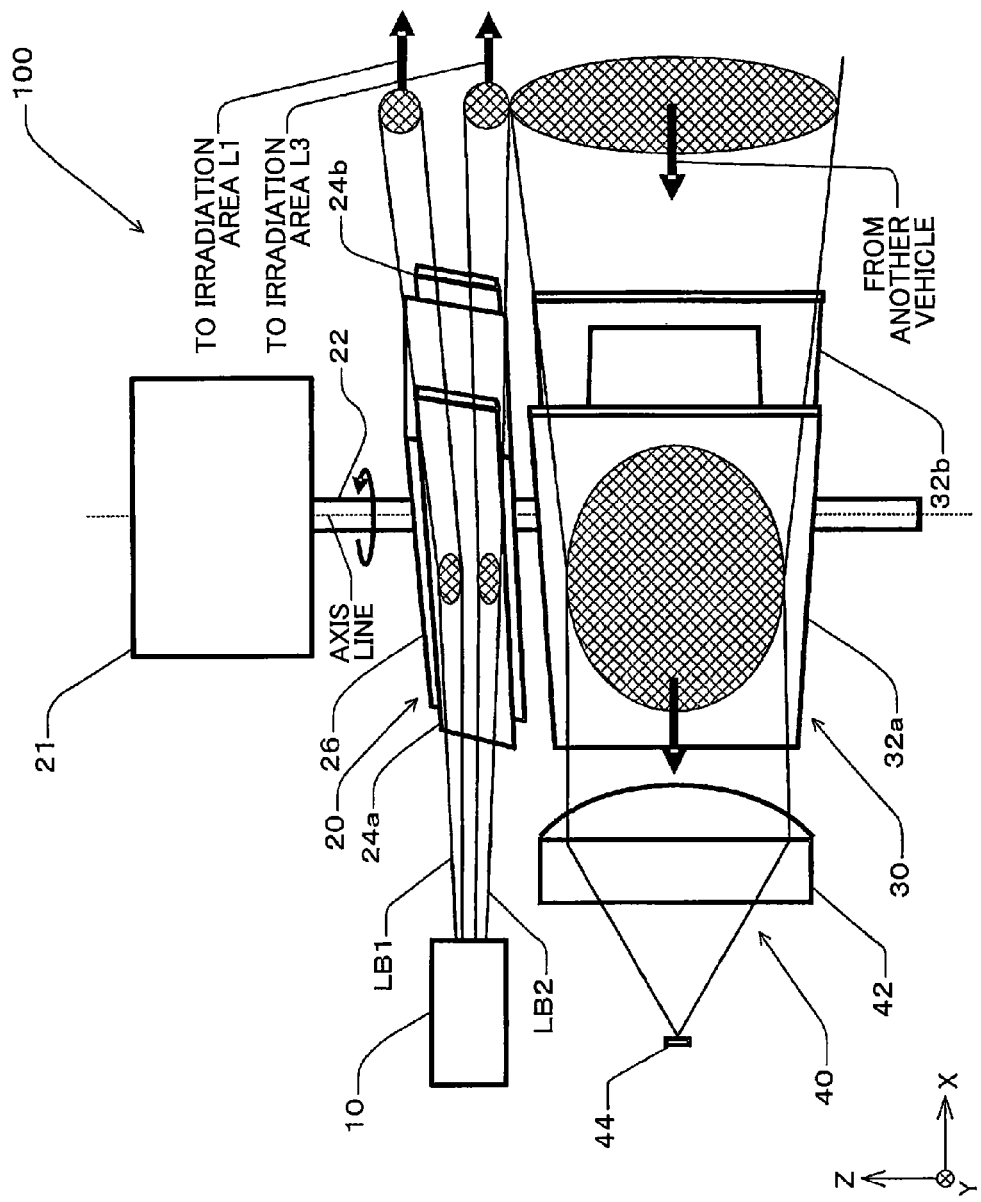
FIG. 1 is a diagram illustrating a general configuration of a distance measuring device according to a first embodiment of the present invention.

A first embodiment of the present invention will be described based on FIG. 1-FIG. 11, below. FIG. 1 illustrates a general configuration of a distance measuring device 100 according to the first embodiment.

By way of example, the distance measuring device 100 is a device mounted on a vehicle for irradiating another vehicle as an object with light and receiving reflected light therefrom so that a distance from another vehicle is measured, and more particularly, a device for measuring distances from plural places on a surface of another vehicle for a short time.

Additionally, a distance measuring device according to an embodiment of the present invention may be mounted and used on a stationary object or moving object other then a vehicle or may be used singularly. Furthermore, an "object" also includes a stationary object and a moving object other than a vehicle.

As illustrated in FIG. 1, the distance measuring device 100 includes a light source device 10, a rotation axis 22, a deflector 20 as an example of an deflection part, a reflector 30 as an example of a reflection part, a light-receiving part 40, a measurement processing device (not illustrated in the figures), etc.

Herein, an XYZ-three-dimensional orthogonal coordinate system is set in such a manner that a direction of a Z-axis is a direction orthogonal to a direction of movement of a vehicle on which the distance measuring device 100 is mounted.

Figure 2:
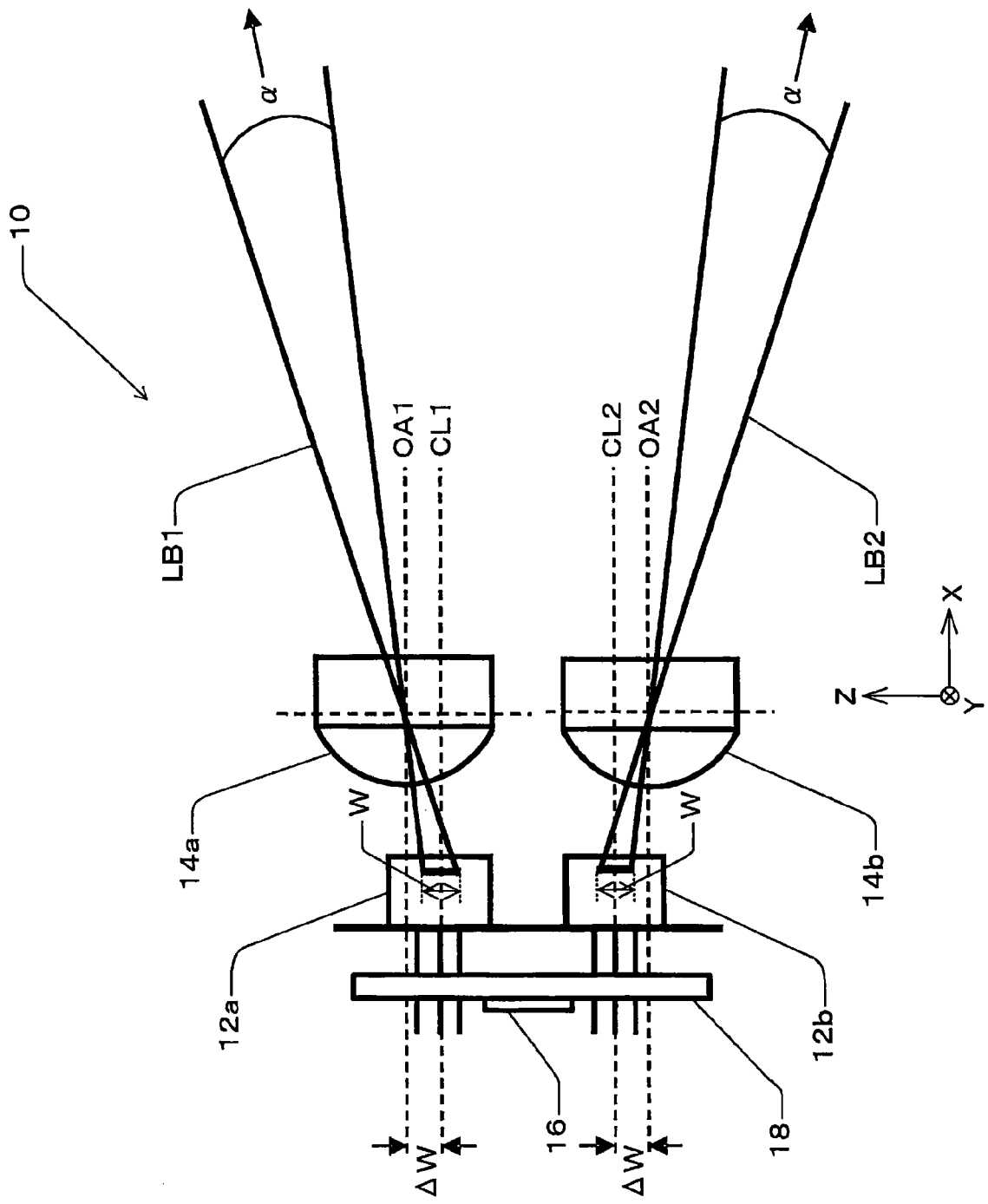
FIG. 2 is a diagram illustrating a light source device included in a distance measuring device.

As illustrated in FIG. 2, the light source device 10 includes two light sources 12a and 12b, a circuit board 18 including a light source driving circuit 16, and two coupling lenses 14a and 14b.

By way of example, the two light sources 12a and 12b are substantially identical thereto and packaged on the circuit board 18. Each light source includes a semiconductor laser (edge-emitting laser) as a light-emitting part. The two light sources 12a and 12b are arranged in such a manner that center lines CL1 and CL2 extending in respective directions of emission thereof are parallel to an X-axis and mutually separated in a direction of a Z-axis. The light source 12a is arranged at a +Z side of the light source 12b. The light source 12a emits laser light beam LB1 at a +X side. The light source 12b emits a laser light beam LB2 at a +X side.

Figure 3:
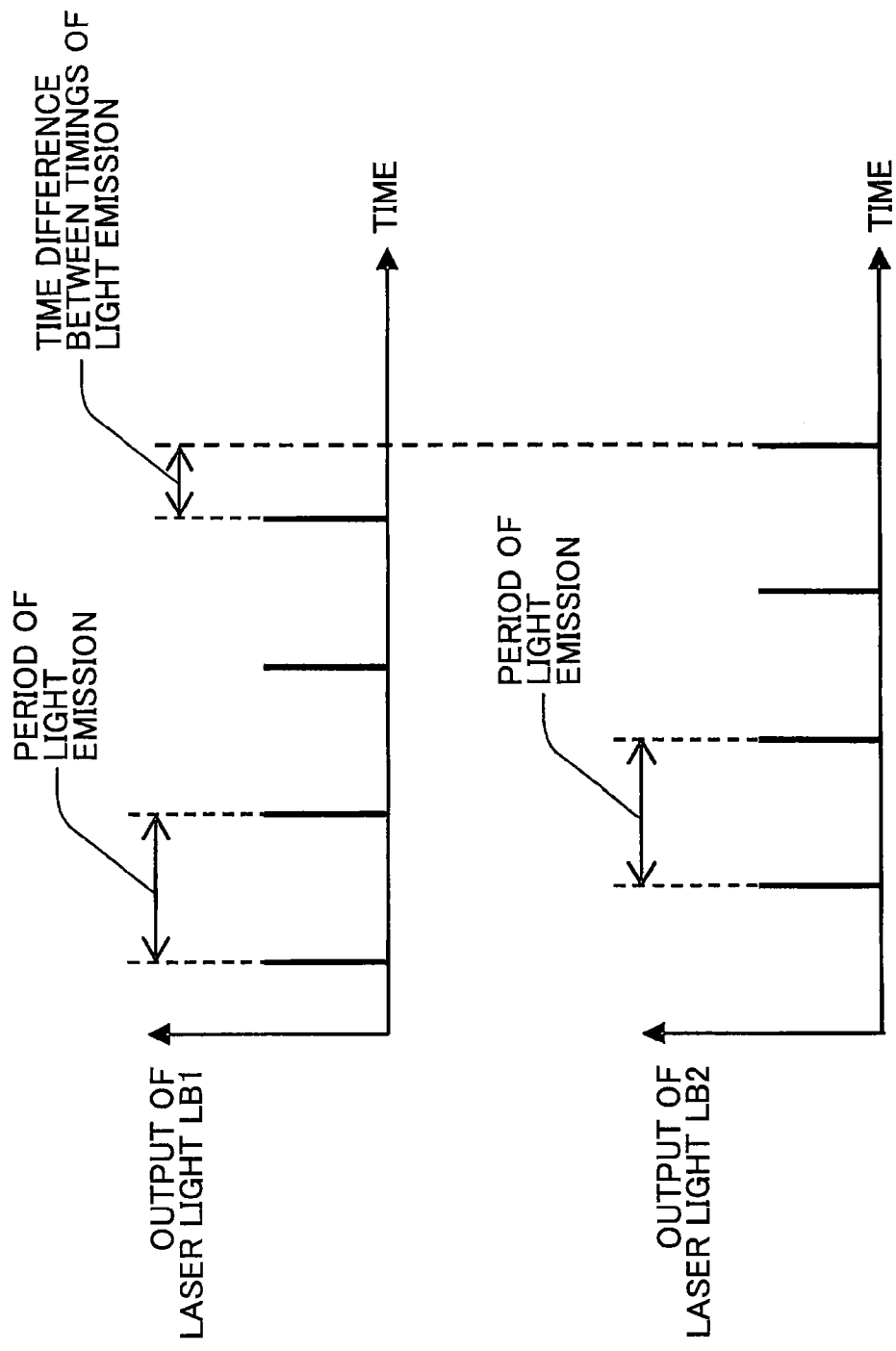
FIG. 3 is a timing chart illustrating timing of light emission of each light source.

As illustrated in FIG. 3, the light source driving circuit 16 intermittently drives (conducts pulsed driving of) each of the two light sources 12a and 12b. Specifically, the light source driving circuit 16 drives the two light sources 12a and 12b in such a manner that periods of light emission thereof are equal and timings of light emission thereof are different. Herein, by way of example, timing of light emission of the light source 12b is delayed by ½ of a period(s) of light emission, as compared to timing of light emission of the light source 12a. By way of example, a time period of light emission per one pulse of each light source is about several nanoseconds (ns)-100 nanoseconds (ns).

Herein, it is desirable that a time difference between timings of light emission of the two light sources 12a and 12b is 3 microseconds (µs) or greater. That is because if such a time difference between timings of light emission is too small, two reflected light beams from an object with respect to the two laser light beams LB1 and LB2 may interfere so that it may not be possible to separate signals of such two reflected light beams. Such a matter will be described in more detail, below.

As Δt is a difference between a time at which a light pulse is delivered from a light source and a time at which reflected light of the light pulse is detected and C is a velocity of light, a distance L to an object is given as L=Δt×C÷2. For example, when Δt is 3 microseconds (µs), L is 450 m. In general, a detectable distance of a distance measuring device is generally at most about 200 m, and even if reflected light returns from 450 m ahead, light intensity thereof is sufficiently small, so that even if two reflected light beams of two light pulses delivered continuously interfere, little influence is provided.

Furthermore, a frequency of light emission for a light pulse in a distance measuring device is generally set at about 10 kHz-100 kHz, which is converted to a period of light emission of 10 microseconds (µs)-100 microseconds (µs). In such a case, it may be preferable that a time difference between timings of light emission of the two light sources 12a and 12b is set at 10 microseconds (µs) or less. As a result, it may be possible to cause the two light sources 12a and 12b to conduct light emission alternately.

By returning to FIG. 2, by way of example, plano-convex lenses having substantially identical optical characteristics are adopted for the two coupling lenses 14a and 14b. The coupling lens 14a is arranged at a +X side of the light source 12a, that is, on an optical path of a laser light beam from the light source 12a. The coupling lens 14b is arranged at a +X side of the light source 12b, that is, on an optical path of a laser light beam from the light source 12b.

Optical axes OA1 and OA2 of the two coupling lenses 14a and 14b are parallel to an X-axis and are located at positions such that the center lines CL1 and CL2 of the two light sources 12a and 12b are interposed therebetween with respect to a direction of a Z-axis.

In such a case, a laser light beam LB1 emitted from the light source 12a at a +Z side enters the coupling lens 14a from a −Z side of the optical axis OA1 of the coupling lens 14a, intersects with the optical axis OA1, and subsequently exits to a +Z side of the optical axis OA1 so as to provide a predetermined output angle and a predetermined spread angle. Furthermore, a laser light beam LB2 emitted from the light source 12b at a −Z side enters the coupling lens 14b from a +Z side of the optical axis OA2 of the coupling lens 14b, intersects with the optical axis OA2, and subsequently exits to a −Z side of the optical axis OA2 so as to provide a predetermined output angle and a predetermined spread angle. Herein, unless otherwise noted in the present specification, an "output angle" means an angle of a chief ray of a subject laser light beam with respect to an XY-plane (horizontal plane) and a "spread angle" means an angle of spreading of a subject laser light beam with respect to a direction of a Z-axis (a vertical direction).

Herein, an output angle θ of a laser light beam is represented by the following formula (1):

$$\theta \approx \tan^{-1}\left(\frac{\Delta W}{f}\right)[\text{rad}] \quad (1)$$

wherein a distance (offset amount) ΔW between a center line extending in a direction of emission of a light source (which will be referred to simply as a center line of a light source, below) and an optical axis of a corresponding coupling lens and a focal length f of a coupling lens are used.

Furthermore, a spreading angle Δθ of a laser light beam is represented by the following formula (2):

$$\Delta\theta \approx \tan^{-1}\left(\frac{W}{f}\right)[\text{rad}] \quad (2)$$

wherein a width of a light emission region of a light source (a width of a light emission region of a light-emitting part with respect to a direction of a Z-axis) W and a focal length f of a coupling lens are used.

Hence, it may be possible to adjust an offset amount ΔW between a center line of a light source and an optical axis of a coupling lens, a width W of light emission region of a light source, and a focal length f of a coupling lens, to emit a laser light beam with a desired output angle and spreading angle.

Accordingly, in the present embodiment, a width W of light emission region of each light source is equal to a value of an offset amount ΔW between a center line of the light source and an optical axis of a corresponding coupling lens (W=|ΔW|) and directions of offset of a center line of each light source and an optical axis of a corresponding coupling lens are mutually opposite directions.

Figure 4:
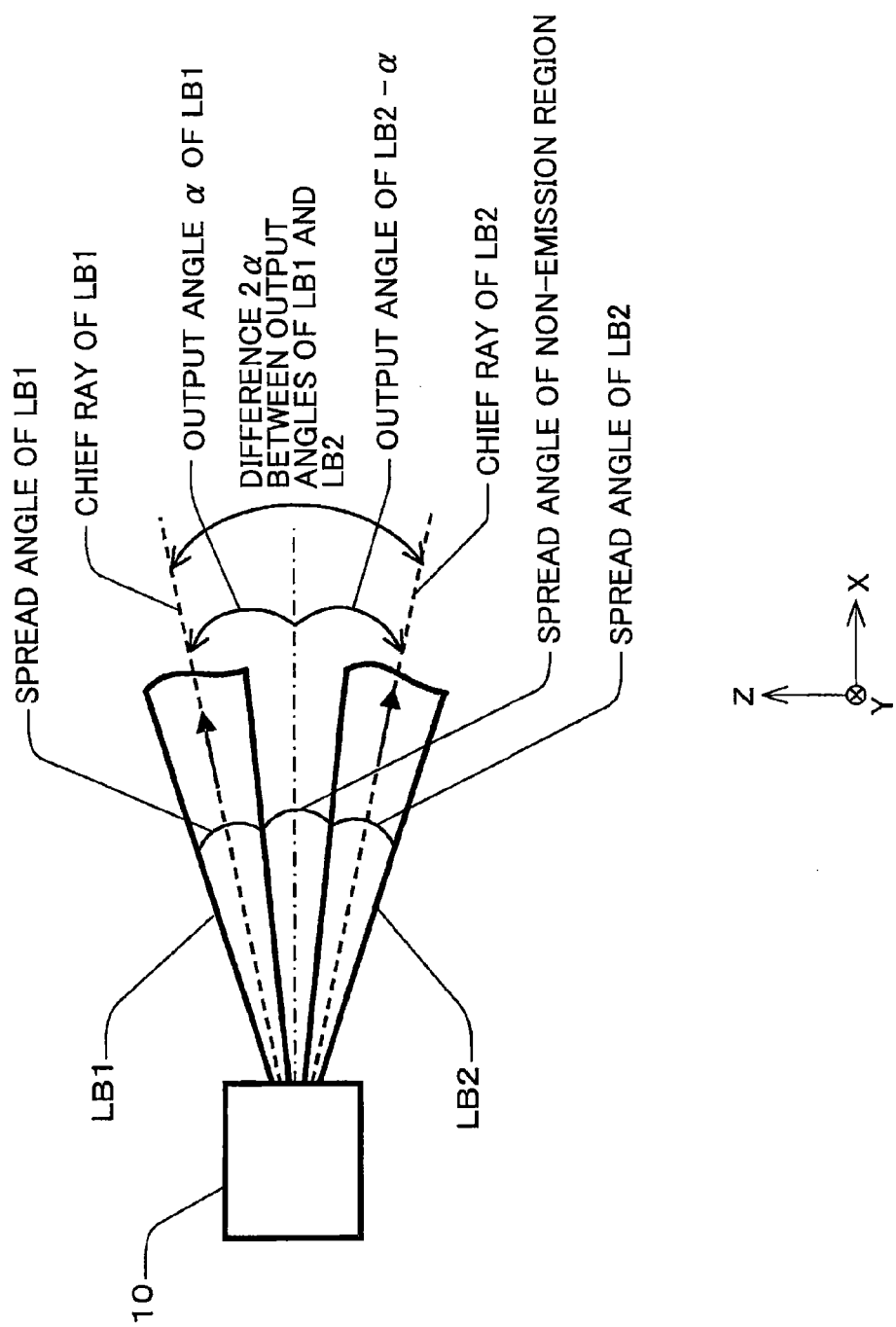
FIG. 4 is a diagram illustrating laser light emitted from each light source of a light source device.

In such a case, as illustrated in FIG. 4, values of output angles θ and spread angles Δθ of the two laser light beams LB1 and LB2 are all equal values α, wherein a difference between output angles of both laser light beams is twice a spread angle(s) α. As a result, a value of a spread angle of a region with no laser light emission (which will be referred to as a "non-emission region", below) between optical paths of the two laser light beams LB1 and LB2 is also equal to α.

Specifically, as a width W of light emission region of a light source and an offset amount ΔW are 80 μm and a focal length of a coupling lens is 5.7 mm, output angles α and spread angles α of the two laser light beams LB1 and LB2 are all 0.8° and a spread angle α of a non-emission region and a difference 2α between the output angles are 0.8° and 1.6°, respectively.

As described above, it may be possible for the light source device 10 to emit a laser light beam LB1 at a +X side and obliquely upward at a +Z side and it may be possible to emit a laser light beam LB2 at a +X side and obliquely downward at a −Z side. Herein, by way of example, the light source device 10 intermittently emits the two laser light beams LB1 and LB2 at different output angles (for example, 0.8° and −0.8°, at equal spread angles (for example, 0.8°), and at different timings.

Figure 5:
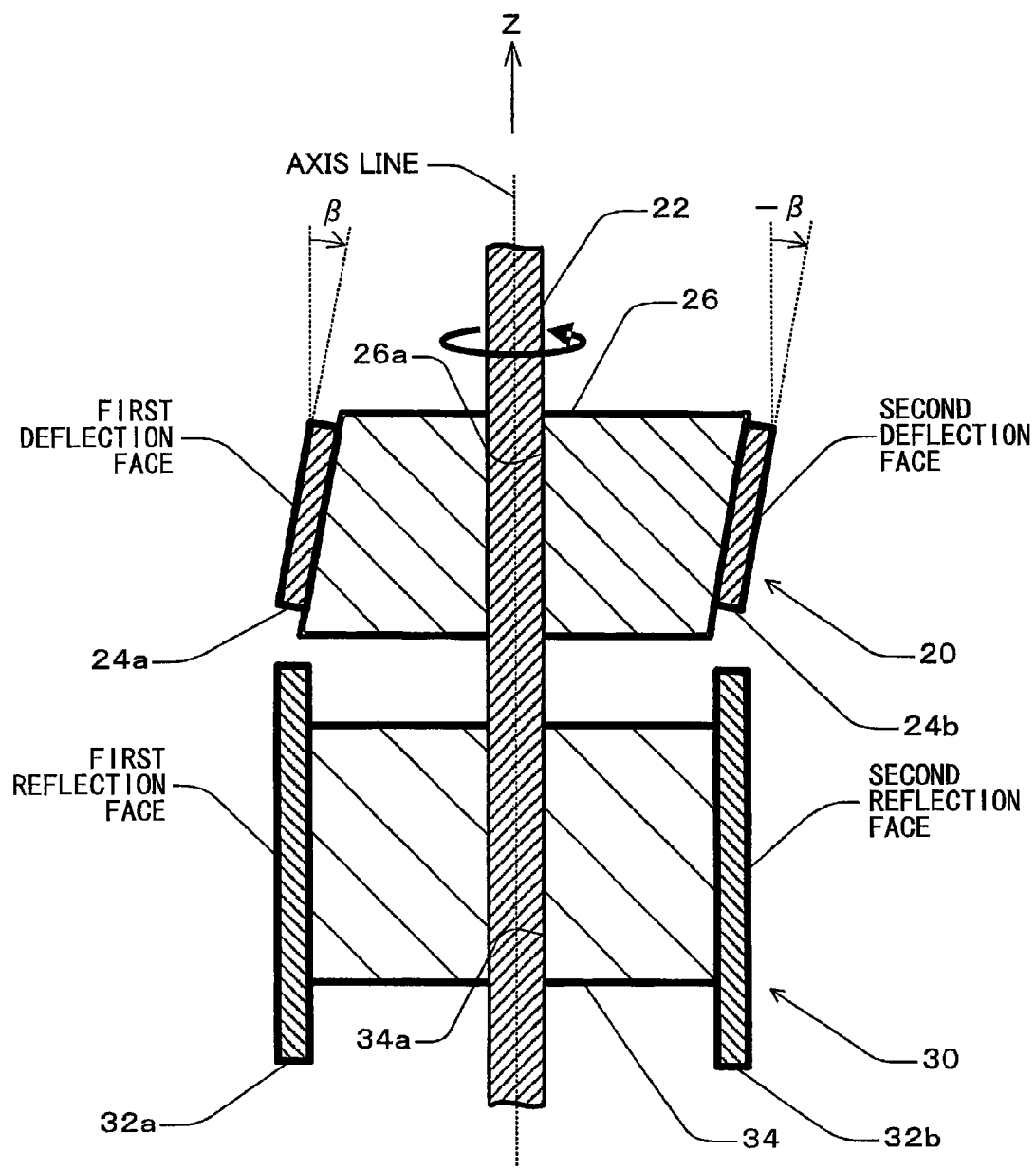
FIG. 5 is a diagram illustrating a deflector and reflector included in a distance measuring device.

FIG. 5 illustrates a cross-sectional diagram in which the rotation axis 22, the deflector 20, and the reflector 30 are cut in a predetermined cross-section parallel to a Z-axis.

The rotation axis 22 is composed of an axis member with an axis line parallel to a Z-axis, and by way of example, arranged at a +X side of the light source device 10 (see FIG. 1). The rotation axis 22 is rotationally driven at a predetermined rotational speed around an axis line thereof by a driving device 21 including, for example, a motor, etc. (see FIG. 1). Additionally, by way of example, the rotation axis 22 rotates in a direction of an arrow in FIG. 5.

As illustrated in FIG. 5, the deflector 20 and the reflector 30 are attached to the rotation axis 22 so as to be mutually separated in a direction of a Z-axis. The deflector 20 is arranged at a +Z side of the reflector 30. Configurations of the deflector 20 and reflector 30 will be described in detail, below.

The deflector 20 includes a first deflection mirror 24a as an example of a member having a deflection face, a second deflection mirror 24b as an example of a member having a deflection face, a mirror base 26, etc.

By way of example, the mirror base 26 is composed of a hexahedron-shaped member having four side faces, wherein a through-hole 26a extending in a direction of a Z-axis is formed at a central portion thereof. The rotation axis 22 is inserted into the through-hole 26a. The mirror base 26 is fixed on the rotation axis 22 and rotates around an axis line of the rotation axis 22 together with the rotation axis 22.

The first and second deflection mirrors 24a and 24b are attached to a pair of opposing faces of the mirror base 26 which are opposed so as to interpose the rotation axis 22 in a direction orthogonal to a Z-axis. That is, respective deflection mirrors are arranged at different positions of the mirror base 26 around the rotation axis 22. A face of each deflection mirror at an opposite side of a face attaching to the mirror base 26 is a deflection face for reflecting, and thereby deflecting, a laser light beam. Conveniently, a deflection face of the first deflection mirror 24a may also be referred to as a "first deflection face" and a deflection face of the second deflection mirror 24b may also be referred to as a "second deflection face", below.

Herein, a distance between the light source device 10 and the rotation axis 22 and heights of the light source device 10 and each deflection mirror are set in such a manner that it is possible for the two laser light beams LB1 and LB2 emitted from the light source device 10 to be incident on respective deflection faces. Herein, by way of example, the light source device 10 and each deflection mirror are arranged at a height which is generally identical to that of another vehicle (for example, an automobile) as an object.

Then, as the rotation axis 22 rotates, the first and second deflection mirrors 24a and 24b rotate around an axis line of the rotation axis 22 together with the rotation axis 22 so that respective deflection faces (alternately) oppose the light source device 10 at mutually different timings (see FIG. 1). In such a case, a timing at which a laser light beam from the light source device 10 is incident on the first deflection mirror 24a is different from a timing at which a laser light beam from the light source device 10 is incident on the second deflection mirror 24b.

Furthermore, defection faces of each deflection mirror are mutually parallel and tilted by an identical angle β (>0) with respect to an axis line of the rotation axis 22. That is, inclination angles of respective deflection faces with respect to an axis line of the rotation axis 22 (tilt angles thereof in a vertical direction) are different, and more particularly, values and directions of the inclination angles are equal and different, respectively. Herein, in regard to a direction of such an inclination angle, a positive direction refers to a case where a deflection face is tilted so as to get close to the rotation axis 22 at +Z side, and a negative direction refers to a case where a deflection face is tilted so as to get away from the rotation axis 22 at +Z side. For example, as β is an inclination angle of the first deflection mirror 24a, an inclination angle of the second deflection mirror 24b is −β.

Herein, an inclination angle β of the first deflection mirror 24a is set in such a manner that a value of an output angle of each laser light beam deflected by the first deflection mirror 24a is a value provided by adding, to an output angle of a laser light beam from the light source device 10, ½ of an absolute value of the output angle. That is, an inclination angle β is set in such a manner that output angles of laser light beams LB1 and LB2 from the first deflection mirror 24a are α+(½)α and −α+(½)α, respectively. Specifically, as α=0.8° is provided, α+(½)α=1.2° and −α+(½)α=−0.4° are provided (see FIG. 7).

Furthermore, an inclination angle −β of the second deflection mirror 24b is set in such a manner that a value of an output angle of each laser light beam deflected by the second deflection mirror 24b is a value provided by subtracting, from an output angle of a laser light beam from the light source device 10, ½ of an absolute value of the output angle. That is, an inclination angle −β is set in such a manner that output angles of laser light beams LB1 and LB2 from the second deflection mirror 24b are α−(½)α and −α−(½)α, respectively. Specifically, as α=0.8° is provided, α−(½)α=0.4° and −α−(½)α=−1.2° are provided (see FIG. 8).

Figure 6B:
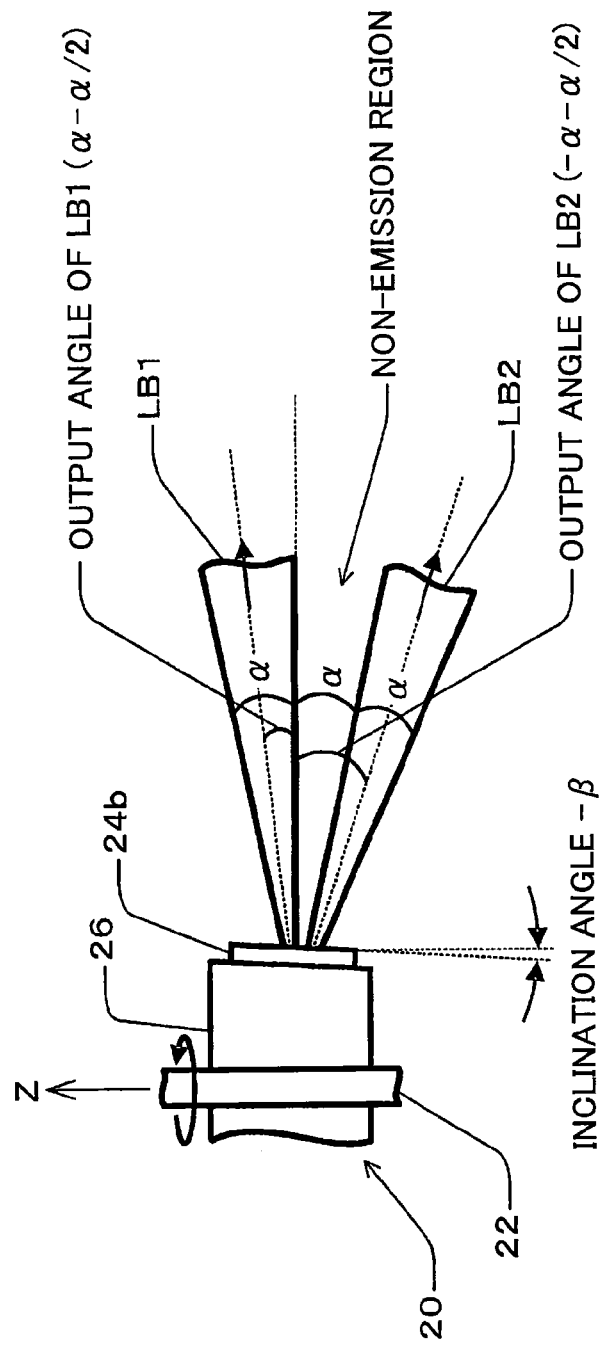

In such a case, as seen from FIG. 6A and FIG. 6B, it may be possible to locate an optical path of a laser light beam LB1 from the second deflection mirror 24b between optical paths of laser light beams LB1 and LB2 from the first deflection mirror 24a, with respect to a direction of a Z-axis, and it may be possible to locate an optical path of a laser light beam LB2 from the first deflection mirror 24a between optical paths of laser light beams LB1 and LB2 from the second deflection mirror 24b.

That is, it may be possible to provide the first deflection mirror 24a with an inclination angle β and provide the second deflection mirror with an inclination angle −β, so as to interpolate a non-emission region between optical paths of the two laser light beams LB1 and LB2.

As described above, laser light beams LB1 and LB2 emitted from the light source device 10 are incident on different positions of a deflection face of the first deflection mirror 24a located at a position opposing to the light source device 10 with respect to a direction of a Z-axis at different timings. Then, laser light beams LB1 and LB2 incident on the first deflection mirror 24a are reflected toward another vehicle at different output angles with respect to a direction of a Z-axis (for example, 1.2° and)-0.4°, at equal spread angles (for example, 0.8°), and at different timings (see FIG. 7).

Furthermore, when laser light beams LB1 and LB2 are reflected by the first defection mirror 24a located at a position opposing to the light source device 10, reflection is conducted in a predetermined direction parallel to an XY-plane as viewed from a +Z direction, depending on a position (rotational position) around an axis line of the rotation axis 22 of the first deflection mirror 24a.

Figure 7:
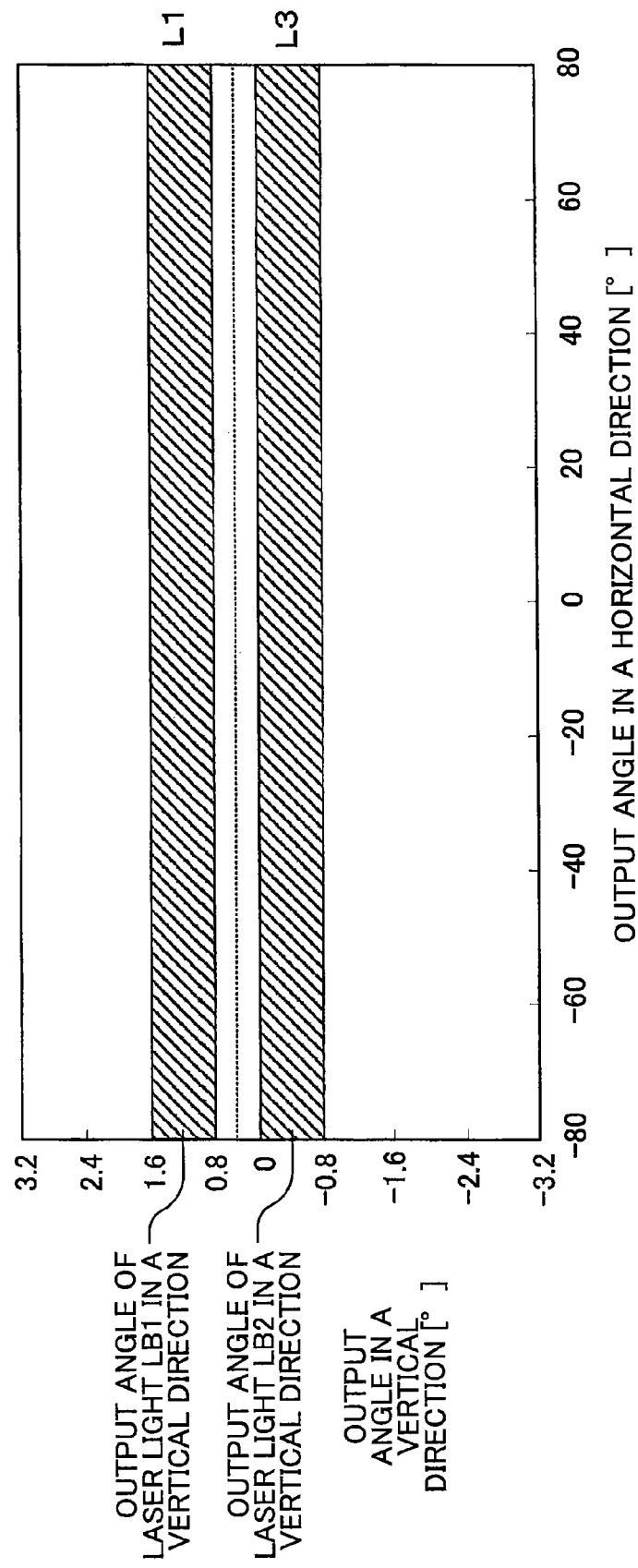
FIG. 7 is a diagram illustrating output angles of two laser light beams from a first deflection mirror with respect to a direction parallel to an XY-plane and a direction of a Z-axis.

Then, laser light beams LB1 and LB2 are emitted from respective corresponding light sources sequentially and deflected (reflected) by the deflection mirror 24a so as to change deflection angles parallel to an XY-plane gradually, and as a result, it may be possible to scan, among four irradiation areas (L1-L4) juxtaposed without a gap in a direction of a Z-axis of another vehicle and having generally equal lengths in a direction of a Z-axis, first and third irradiation regains L1 and L3 from a top thereof in a horizontal direction (see FIG. 7). Additionally, reflected light from the deflection mirror 24a is gradually diverged to irradiate another vehicle, and hence, a length of each irradiation area in a direction of a Z-axis depends on a distance between the rotation axis 22 and such an irradiation area increases while increasing such a distance.

Furthermore, laser light beams LB1 and LB2 emitted from the light source device 10 are incident on a deflection face of the second deflection mirror 24b located at a position opposing to the light source device 10, at different positions with respect to a direction of a Z-axis, at different timings. Then, laser light beams LB1 and LB2 incident on the second deflection mirror 24b are reflected toward another vehicle at different output angles (0.4 and)-1.2°, at equal spread angles (0.8°), and at different timings (see FIG. 8).

Furthermore, when laser light beams LB1 and LB2 are reflected by the second deflection mirror 24b located at a position opposing to the light source device 10, reflection is conducted in a predetermined direction parallel to an XY-plane as viewed from a +Z direction, depending on a position (rotational position) around an axis line of the rotation axis 22 of the second deflection mirror 24b.

Figure 8:
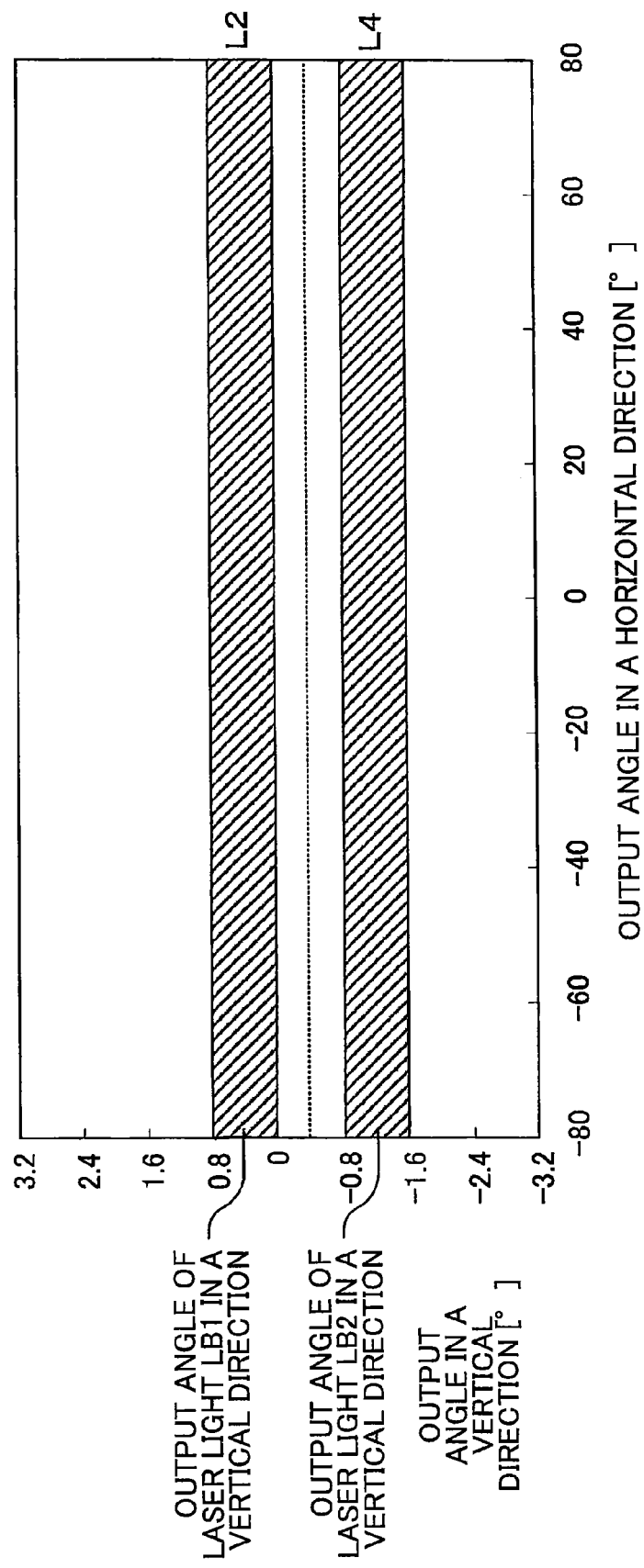
FIG. 8 is a diagram illustrating output angles of two laser light beams from a second deflection mirror with respect to a direction parallel to an XY-plane and a direction of a Z-axis.

Then, laser light beams LB1 and LB2 are emitted from respective corresponding light sources sequentially and deflected (reflected) by the second deflection mirror 24b so as to change deflection angles parallel to an XY-plane gradually, and as a result, it may be possible to scan, among four irradiation areas (L1-L4) of another vehicle, second and fourth irradiation regains L2 and L4 from a top thereof in a horizontal direction (see FIG. 8).

Figure 9:
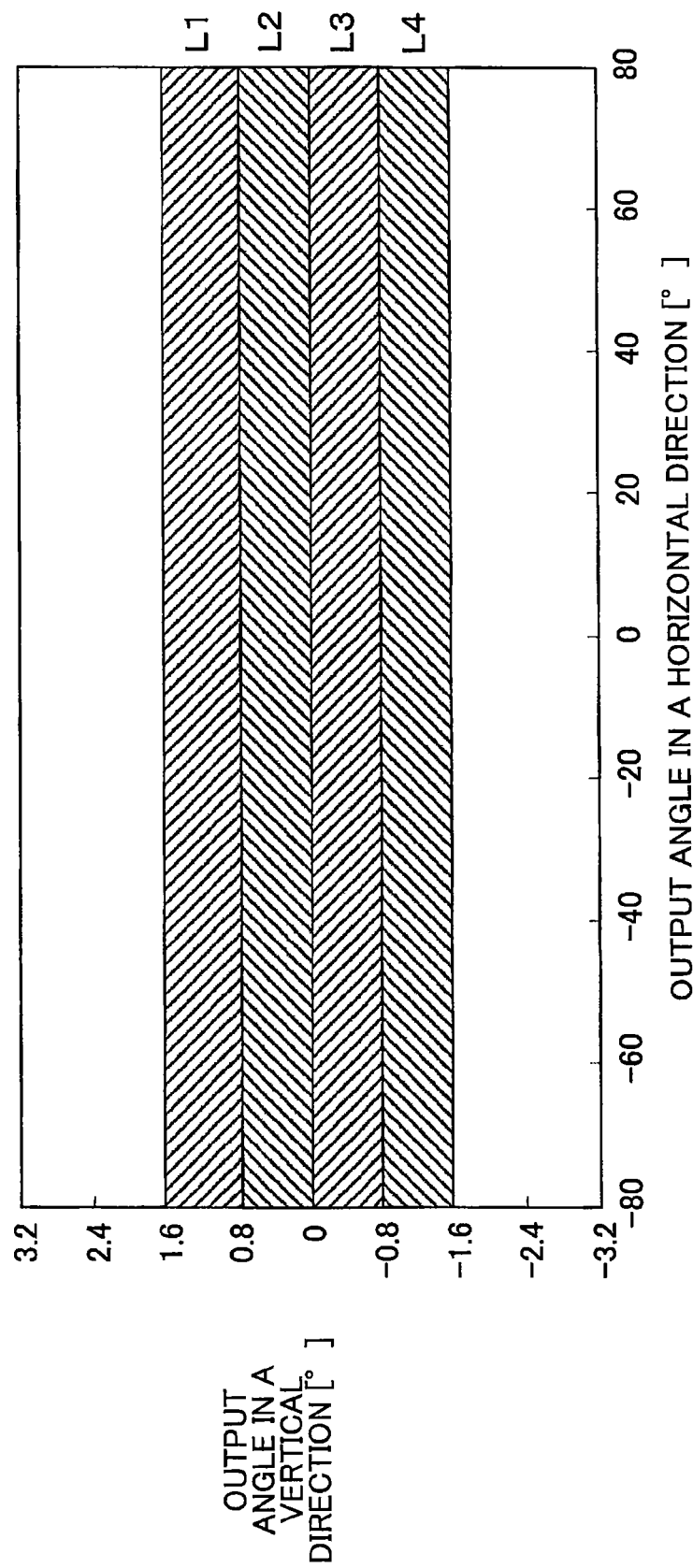
FIG. 9 is a diagram illustrating an output angle provided by compounding output angles illustrated in FIG. 7 and FIG. 8.

As describe above, it may be possible for the first and second deflection mirrors 24a and 24b to alternately deflect the respective laser light beams LB1 and LB2 emitted from the light source device 10 sequentially, to scan four irradiation areas (L1-L4) of another vehicle in a horizontal direction for a short time. Additionally, FIG. 9 illustrates that irradiation areas for respective laser light beams deflected by the first and second deflection mirrors 24a and 24b are compounded and each of four irradiation areas L1-L4 is scanned in a horizontal direction.

A portion of a laser light beam having irradiated and been reflected from a corresponding irradiation area of another vehicle returns on a previous optical path while diverging gradually.

By returning to FIG. 5, the reflector 30 includes a first reflection mirror 32a as an example of a member having a reflection face, a second reflection mirror 32b as an example of a member having a reflection face, a mirror base 34, etc.

By way of example, the mirror base 34 is composed of a rectangular-parallelepiped-shaped member having four side faces, wherein a through-hole 34a extending in a direction of a Z-axis is formed at a central portion thereof. The rotation axis 22 is inserted into the through-hole 34a. The mirror base 34 is fixed on the rotation axis 22 and rotates around an axis line of the rotation axis 22 together with the rotation axis 22.

The first and second reflection mirrors 32a and 32b are attached to a pair of opposing faces of the mirror base 34 which are opposed so as to interpose the rotation axis 22 in a direction orthogonal to a Z-axis. Reflection surfaces of respective reflection mirrors, that is, faces at opposite sides of faces attaching to the mirror base 34 are mutually parallel and are parallel to an axis line of the rotation axis 22. The first reflection mirror 32a corresponds to the first deflection mirror 24a and a position thereof around a Z-axis is identical to that of the first deflection mirror 24a. The second reflection mirror 32b corresponds to the second deflection mirror 24b and a position thereof around a Z-axis is identical to that of the second deflection mirror 24b. A size of each reflection mirror in a direction of a Z-axis is set to be greater than that of a corresponding deflection mirror. Conveniently, a reflection face of the first reflection mirror 32a may also be referred to as a "first reflection face" and a reflection face of the second reflection mirror 32b may also be referred to as a "second reflection face", below.

As described above, portions of laser light beams deflected by the first deflection mirror 24a and reflected by respective irradiation areas L1 and L3 of another vehicle are incident on the reflection mirror 32a. Furthermore, portions of laser light beams deflected by the deflection mirror 24b and reflected by respective irradiation areas L2 and L4 of another vehicle are incident on the reflection mirror 32b.

Figure 10A:
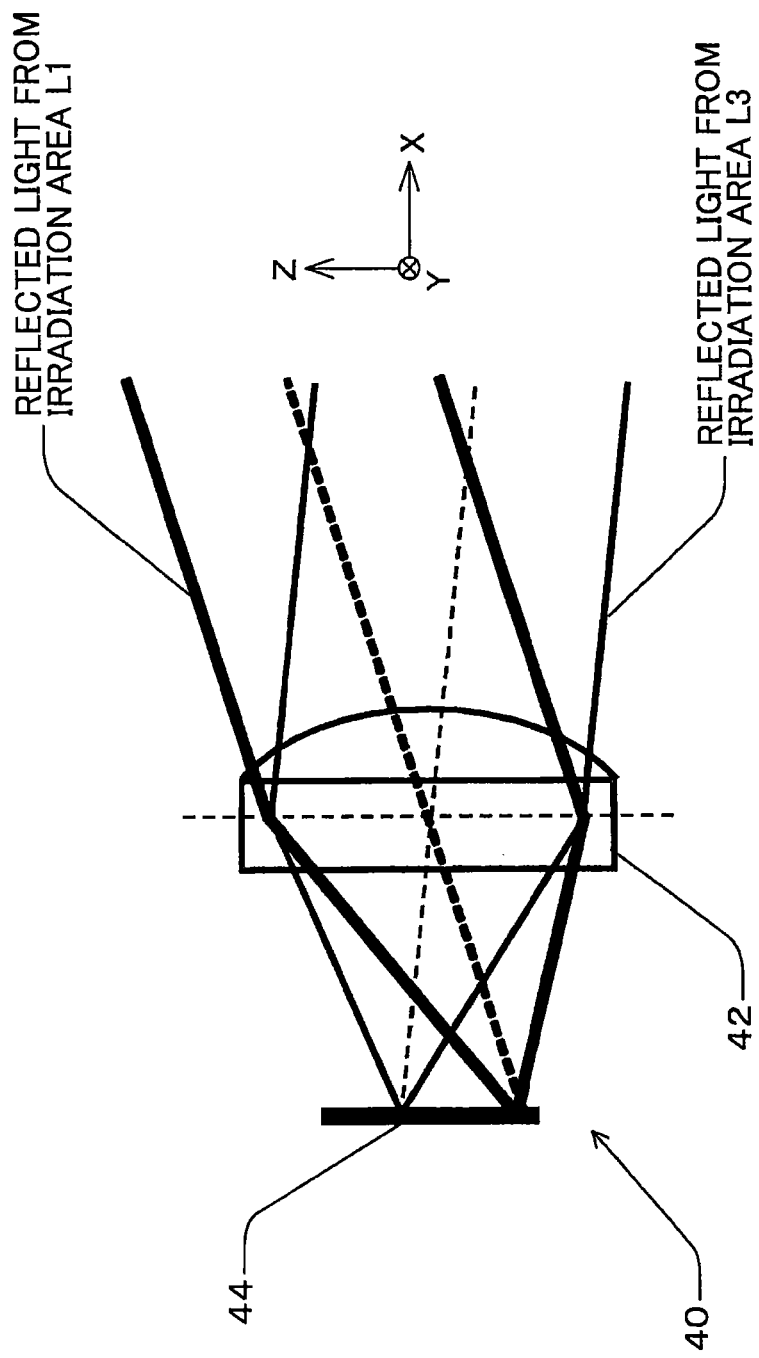
FIG. 10A and FIG. 10B are diagrams (part 1 and part 2) illustrating a light-receiving part included in a distance measuring device.
Figure 10B:
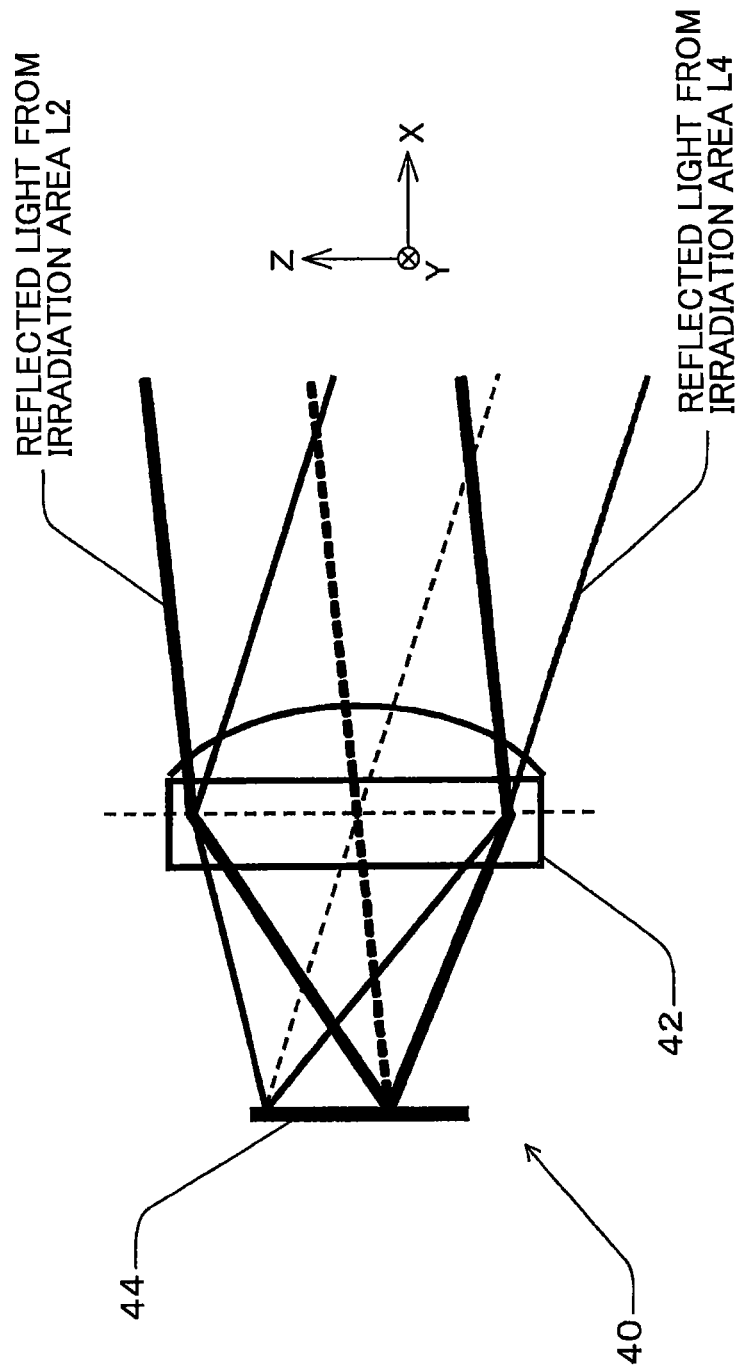

As illustrated in FIG. 10A and FIG. 10B, the light-receiving part 40 includes a condenser lens 42, a light-receiving element 44, etc.

By way of example, the condenser lens 42 is a plano-convex lens and is arranged on an optical path of a laser light beam reflected by each reflection mirror. More particularly, the condenser lens 42 is arranged at a −X side of the rotation axis 22 and at a height which is generally identical to that of each reflection mirror, in such a manner that an optical axis thereof is orthogonal to an axis line of the rotation axis 22 (see FIG. 1). By way of example, the light-receiving element 44 is a photodiode and is arranged on an optical path of a laser light beam via the condenser lens 42. Additionally, it may be preferable for the light-receiving element 44 to be arranged near a position of a focus of the condenser lens 42 from the viewpoint of attainment of miniaturization thereof.

In such a case, when a deflection face of the first deflection mirror 24a opposes the light source device 10, a reflection face of the first reflection mirror 32a opposes the condenser lens 42. As a result, laser light beams deflected by the first deflection mirror 24a and reflected by respective irradiation areas L1 and L3 enter the light-receiving element 44 at different timings via the first reflection mirror 32a and the condenser lens 42.

Furthermore, when a deflection face of the second deflection mirror 24b opposes the light source device 10, a reflection face of the second reflection mirror 32b opposes the condenser lens 42. As a result, laser light beams deflected by the second deflection mirror 24b and reflected by respective irradiation areas L2 and L4 enter the light-receiving element 44 at different timings via the second reflection mirror 32b and the condenser lens 42.

As a result, four laser light beams deflected by the deflector 20 and reflected by four irradiation areas L1-L4 of another vehicle respectively are received by the light-receiving element 44 at mutually different timings.

FIG. 10A illustrates a condition that two laser light beams deflected by the first deflection mirror 24a and reflected by respective irradiation areas L1 and L3 enter the light-receiving element 44 via the condenser lens 42. FIG. 10B illustrates a condition that two laser light beams deflected by the second deflection mirror 24b and reflected by respective irradiation areas L2 and L4 enter the light-receiving element 44 via the condenser lens 42.

A portion of a laser light beam deflected by the first deflection mirror 24a and reflected by an upper irradiation area L1 of another vehicle passes through the condenser lens 42, and then, is condensed on a lower portion of the light-receiving element 44 (at a position lower than an optical axis of the condenser lens 42), wherein a received light signal S1 from the light receiving element 44 is output to the measurement processing device at time of light condensation thereon.

A portion of a laser light beam deflected by the first deflection mirror 24a and reflected by a lower irradiation area L3 of another vehicle passes through the condenser lens 42, and then, is condensed on an upper portion of the light-receiving element 44 (at a position upper than an optical axis of the condenser lens 42), wherein a received light signal S3 from the light receiving element 44 is output to the measurement processing device at time of light condensation thereon.

A portion of a laser light beam deflected by the second deflection mirror 24b and reflected by an upper irradiation area L2 of another vehicle passes through the condenser lens 42, and then, is condensed on a lower portion of the light-receiving element 44 (at a position lower than an optical axis of the condenser lens 42), wherein a received light signal S2 from the light receiving element 44 is output to the measurement processing device at time of light condensation thereon.

A portion of a laser light beam deflected by the second deflection mirror 24b and reflected by a lower irradiation area L4 of another vehicle passes through the condenser lens 42, and then, is condensed on an upper portion of the light-receiving element 44 (at a position upper than an optical axis of the condenser lens 42), wherein a received light signal S4 from the light receiving element 44 is output to the measurement processing device at time of light condensation thereon.

FIG. 11 illustrates a timing of an output of each received light signal by the light-receiving element 44 in a timing chart. Additionally, FIG. 11 is conveniently drawn based on a case where four irradiation areas L1-L4 are equidistant from an axis line of the rotation axis 22 and reflectances of laser light beams on the four irradiation areas L1-L4 are equal. As seen from FIG. 11, first, received light signals S1 and S3 corresponding to irradiation areas L1 and L3, respectively, are alternately outputted in a first time zone in which laser light beams are deflected by the first deflection mirror 24a and reflected by the first reflection mirror 32a, and then, received light signals S2 and S4 corresponding to irradiation areas L2 and L4, respectively, are alternately outputted in a second time zone in which laser light beams are deflected by the second deflection mirror 24b and reflected by the second reflection mirror 32b. Afterward, similarly, output of received light signals S1 and S3 in the first time zone and output of received light signals S2 and S4 in the second time zone are alternately repeated.

The measurement processing device calculates a distance from an irradiation area L1 based on a timing at which each light pulse is delivered from the light source 12a to the first deflection mirror 24a (see FIG. 3) and a time difference from a timing at which a received light signal S1 corresponding to such a pulse is received.

Furthermore, the measurement processing device calculates a distance from an irradiation area L3 based on a timing at which each light pulse is delivered from the light source 12b to the first deflection mirror 24a (see FIG. 3) and a time difference from a timing at which a received light signal S3 corresponding to such a pulse is received.

Furthermore, the measurement processing device calculates a distance from an irradiation area L2 based on a timing at which each light pulse is delivered from the light source 12a to the second deflection mirror 24b (see FIG. 3) and a time difference from a timing at which a received light signal S2 corresponding to such a pulse is received.

Furthermore, the measurement processing device calculates a distance from an irradiation area L4 based on a timing at which each light pulse is delivered from the light source 12b to the second deflection mirror 24b (see FIG. 3) and a time difference from a timing at which a received light signal S4 corresponding to such a pulse is received.

As described above, it may be possible for the distance measuring device 100 to measure distances from plural places juxtaposed in a horizontal direction on four respective irradiation areas L1-L4 juxtaposed on another vehicle without a gap in a direction of a Z-axis, that is, distances from plural places on a surface of another vehicle.

The distance measuring device 100 in the present embodiment as described above includes the light source device 10 having two light-emitting parts with different timings of light emission arranged to be separated in a direction of a Z-axis, the deflector 20 which is provided rotatably around an axis line of the rotation axis 22 parallel to a Z-axis and has two deflection faces for reflecting a laser light beam from the light source device 10 toward another vehicle as an object, the reflector 30 which is provided rotatably around an axis line of the rotation axis 22 and integrally with the deflector 20 and has two reflection faces for corresponding to the two deflection faces individually and reflecting a portion of a laser light beam reflected by a corresponding deflection face and reflected by another vehicle, and the light-receiving part 40 having one light-receiving element 44 for receiving a laser light beam reflected by the reflector 30. Then, respective inclination angles of two deflection faces with respect to an axis line of the rotation axis 22 are set to be mutually different.

In such a case, respective laser light beams from two light-emitting parts of the light source device 10 are incident on different positions of one deflection face, among two deflection faces of the deflector 20, with respect to a direction of a Z-axis at different timings. Respective laser light beams incident on one deflection face are reflected by the deflection face at different output angles with respect to a direction of a Z-axis and predetermined output angles with respect to a direction parallel to an XY-plane depending on a rotational position of the deflector 20. Then, output angles of respective laser light beams reflected by two deflection faces with respect to a direction of a Z-axis are mutually different.

As a result, each of four irradiation areas L1-L4 juxtaposed on another vehicle in a direction of a Z-axis is scanned in a horizontal direction.

Then, portions of respective reflected light beams from four irradiation areas L1-L4 are received on the light-receiving element 44 via corresponding reflection mirrors at different timings.

In such a case, it may be possible to measure distances from plural places juxtaposed on each of four irradiation areas L1-L4 in a horizontal direction by using one light-receiving element. As a result, it may be possible to attain, for example, reduction of the number of parts and reduction of a cost, as compared to a case where two or more light-receiving elements are used.

As a result, according to the distance measuring device 100 in the present embodiment, it may be possible to suppress increase of a cost due to a simple configuration and measure distances from plural places on a surface of another vehicle.

Next, a second embodiment of the present invention will be described based on FIG. 12-FIG. 14. In the second embodiment, members different from those of the above-mentioned first embodiment will be mainly described and members having a configuration similar to that of the above-mentioned first embodiment will be provided with identical reference numerals and descriptions omitted thereof.

In the second embodiment, configurations of a light source device and a light-receiving part are different from those of the above-mentioned first embodiment.

Figure 12:
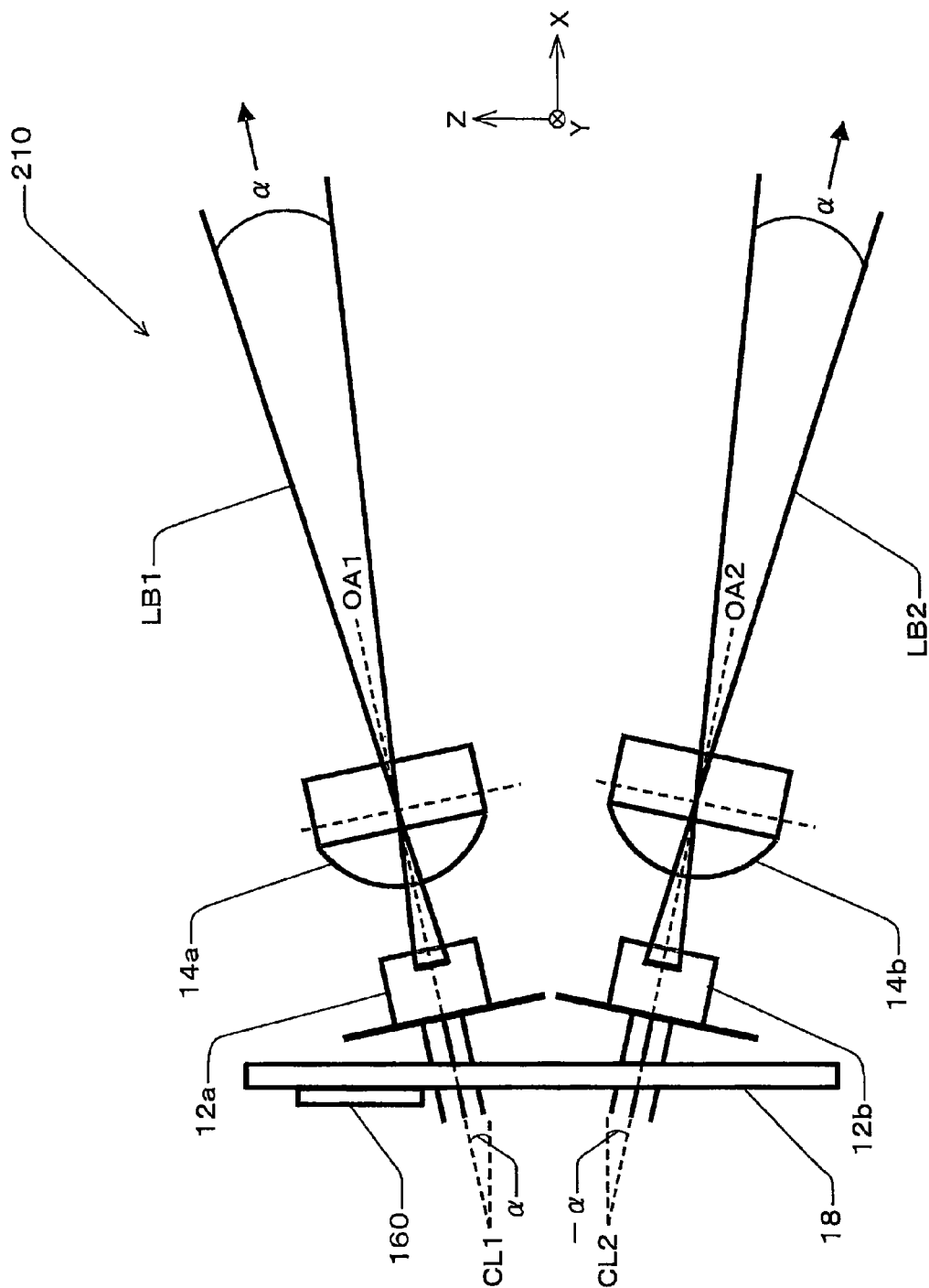
FIG. 12 is a diagram illustrating a light source device in a second embodiment.

As illustrated in FIG. 12, in a light source device 210 in the second embodiment, a light source 12a is arranged in such a manner that an output angle (an angle between a center line CL1 and an X-axis) is a (for example, 0.8°) and a coupling lens 14a is arranged in such a manner that an optical axis OA1 thereof coincides with a center line CL1 of the light source 12a. Furthermore, a light source 12b is arranged in such a manner that an output angle (an angle between a center line CL2 and an X-axis) is $-\alpha$ (for example, $-0.8°$) and a coupling lens 14b is arranged in such a manner that an optical axis OA2 thereof coincides with a center line CL2 of the light source 12b.

In such a case, an angular difference between the two center lines CL1 and CL2 is equal to a difference between output angles of two laser light beams LB1 and LB2. As a result, it may be possible to adjust a width of a light emission region of a light source, a focal length of a coupling lens, and an angular difference between centerlines of light sources so as to emit each laser light beam at a desired output angle and at a desired spread angle.

Herein, a laser light beam emitted from the light source 12a at an output angle $\alpha$ travels along an optical axis of the coupling lens 14a, enters the coupling lens 14a, and exits the coupling lens 14a at an output angle $\alpha$ and at a spread angle $\alpha$. Furthermore, a laser light beam emitted from the light source 12b at an output angle $-\alpha$ travels along an optical axis of the coupling lens 14b, enters the coupling lens 14b, and exits the coupling lens 14b at an output angle $-\alpha$ and at a spread angle $\alpha$.

Additionally, as described above, a spread angle is set at $\alpha$ by adjusting a width of a light emission region of a light source and a focal length of a coupling lens.

Although a center line of each light source coincides with an optical axis of a corresponding coupling lens in FIG. 12, offset thereof may be conducted, wherein, essentially, it may only be necessary that a center line of each light source is parallel to an optical axis of a corresponding coupling lens.

Furthermore, a light source driving circuit 160 in the second embodiment causes the two light sources 12a and 12b to conduct light emission at identical timings of light emission and identical periods of light emission.

Figure 13A:
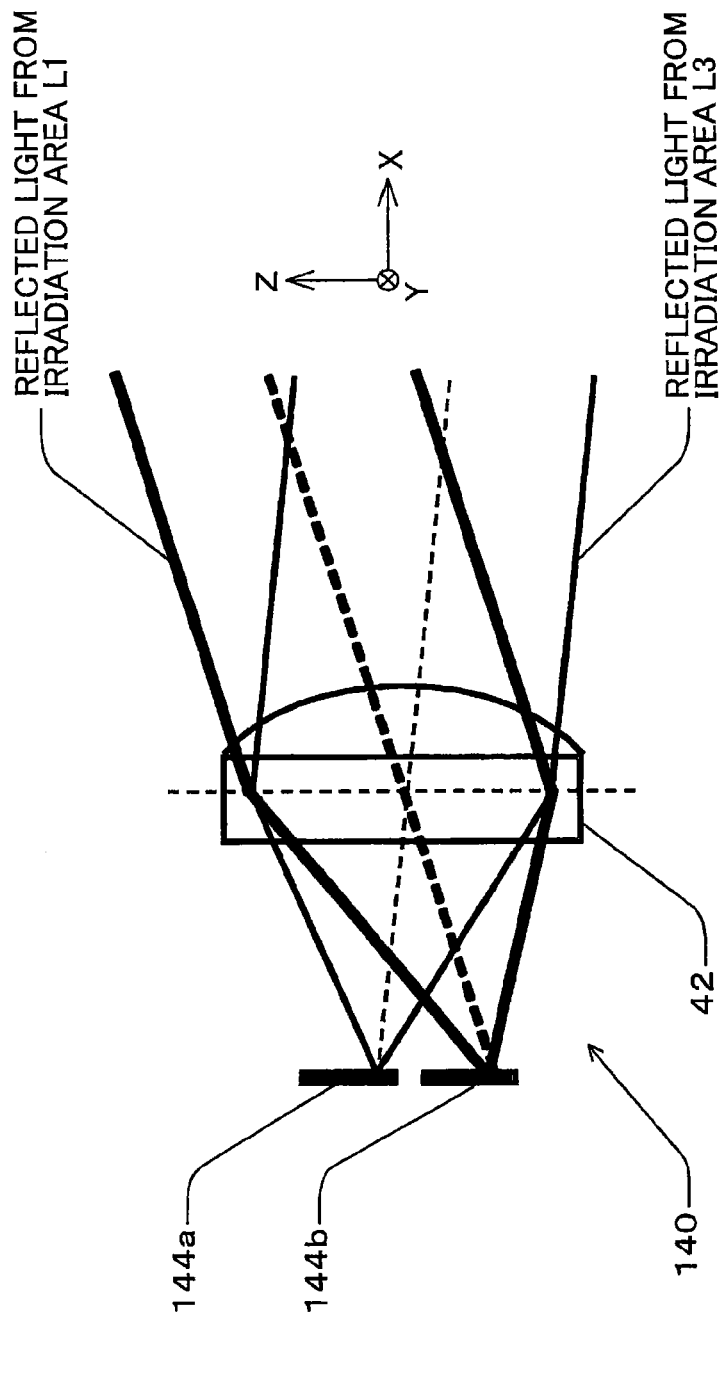

Furthermore, as illustrated in FIG. 13A and FIG. 13B, a light-receiving part 140 in the second embodiment includes two light-receiving elements 144a and 144b. Below, the light-receiving element 144a may also be referred to as a "first light-receiving element" 144a and the light-receiving element 144b may also be referred to as a "second light-receiving element" 144b. The first light-receiving element 144a is arranged at a +Z side of the second light-receiving element 144b.

In the second embodiment, two laser light beams LB1 and LB2 from the light source device 210 are emitted at identical timings and are incident on respective irradiation areas L1 and L3 via the first deflection mirror 24a at generally identical timings.

Then, a portion of reflected light from an irradiation area L1 is received on the second light-receiving element 144b via the first reflection mirror 32a and the condenser lens 42 (see FIG. 13A), wherein a received light signal S1 is output from the second light-receiving element 144b at time of light receiving thereof. Furthermore, a portion of reflected light from an irradiation area L3 is received on the first light-receiving element 144a via the first reflection mirror 32a and the condenser lens 42 (see FIG. 13A), wherein a received light signal S3 is output from the first light-receiving element 144a at time of light receiving thereof.

Furthermore, two laser light beams LB1 and LB2 from the light source device 210 are emitted at identical timings and are incident on respective irradiation areas L2 and L4 via the second deflection mirror 24b at generally identical timings.

Then, a portion of reflected light from an irradiation area L2 is received on the second light-receiving element 144b via the second reflection mirror 32b and the condenser lens 42 (see FIG. 13B), wherein a received light signal S2 is output from the second light-receiving element 144b at time of light receiving thereof. Furthermore, a portion of reflected light from an irradiation area L4 is received on the first light-receiving element 144a via the second reflection mirror 32b and the condenser lens 42 (see FIG. 13B), wherein a received light signal S4 is output from the first light-receiving element 144a at time of light receiving thereof.

Figure 14:
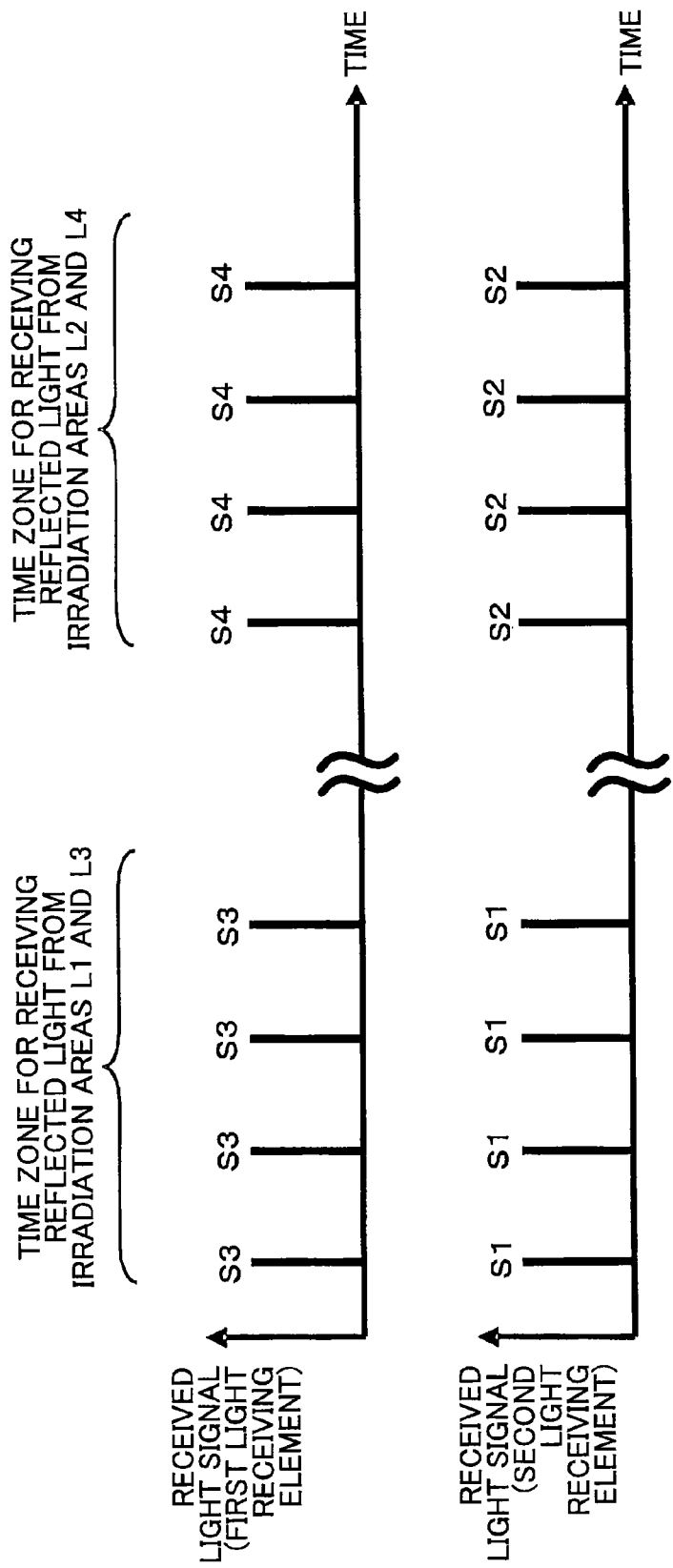
FIG. 14 is a timing chart illustrating timing of output of a received light signal from a light-receiving element in a second embodiment.

FIG. 14 illustrates a timing of an output of each received light signal by the first or second light-receiving element 144a or 144b in a timing chart. Additionally, FIG. 14 is conveniently drawn based on a case where four irradiation areas L1-L4 are equidistant from an axis line of the rotation axis 22 and reflectances of laser light beams on the four irradiation areas L1-L4 are equal.

As seen from FIG. 14, a timing of output of a received light signal S1 from the second light-receiving element 144b is equal to a timing of output of a received light signal S3 from the first light-receiving element 144a. Furthermore, a timing of output of a received light signal S2 from the second light-receiving element 144b is equal to a timing of output of a received light signal S4 from the first light-receiving element 144a.

According to the second embodiment, two laser light beams deflected by one deflection mirror and reflected from two irradiation areas respectively are received on different light-receiving elements, and hence, it may be possible to process received light signals for the two laser light beams separately without causing timings of light emission of the two light sources 12a and 12b to be different (even when timings of light receiving for the two laser light beams overlap). Additionally, timings of light emission of the two light sources 12a and 12b may be different, and in such a case, it may be possible to set a time difference arbitrarily between timings of light emission thereof.

Furthermore, it may be possible to measure distances from plural places juxtaposed on each of four irradiation areas L1-L4 in a horizontal direction, that is, plural places on a surface of another vehicle, by using two light-receiving elements. As a result, it may be possible to attain, for example, reduction of the number of parts and reduction of cost, as compared to a case where three or more light-receiving elements are used.

Next, a third embodiment of the present invention will be described based on FIG. 15-FIG. 17. In the third embodiment, members different from those of each of the above-mentioned first and second embodiments will be mainly described and a member having a configuration similar to that of each of the above-mentioned first and second embodiments will be provided with an identical reference numeral to omit a description(s) thereof.

In the third embodiment, a configuration of a deflector is different from that of each of the above-mentioned first and second embodiments.

Figure 15B:
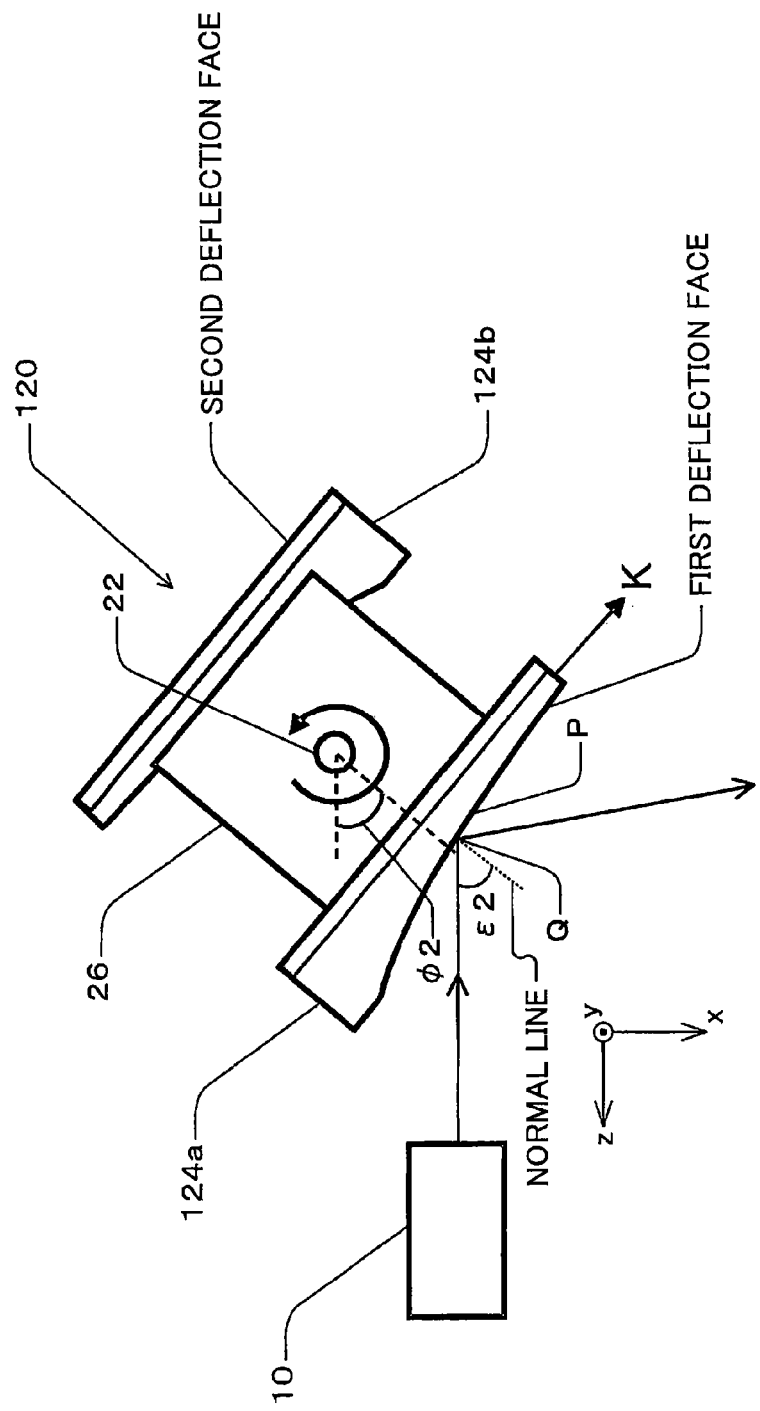

FIG. 15A and FIG. 15B illustrate plan views (top views) of a deflector 120 in the third embodiment. Herein, an xyz-three-dimensional orthogonal coordinate system and a K-axis extending in a direction orthogonal to a y-axis are set for each deflection mirror as illustrated in FIG. 15A.

Meanwhile, when a direction of reflection of a laser light beam from a plane mirror is represented by a light ray matrix representation and as a direction cosine vector of an incident light ray, a direction cosine of a normal line of a mirror plane, and a direction cosine of a reflected light ray are defined as (L, M, N), (l, m, n), and $(L_1, M_1, N_1)$, respectively, a relationship represented by the following formula (3):

$$\begin{pmatrix} L_1 \\ M_1 \\ N_1 \end{pmatrix} = \begin{pmatrix} a_1 & b_1 & c_1 \\ b_1 & a_2 & b_2 \\ c_1 & b_2 & a_3 \end{pmatrix} \begin{pmatrix} L \\ M \\ N \end{pmatrix} \quad (3)$$

$a_1 = 1 - 2l^2, b_1 = -2lm, c_1 = -2ln$ $a_2 = 1 - 2m^2, b_2 = -2mn$ $a_3 = 1 - 2n^2$ is generally satisfied.

As a direction cosine vector of a light ray incident on a deflection mirror in FIG. 15A is (0, 0, −1) in the above-mentioned formula (3), the following formula (4):

$$\begin{pmatrix} L_1 \\ M_1 \\ N_1 \end{pmatrix} = \begin{pmatrix} a_1 & b_1 & c_1 \\ b_1 & a_2 & b_2 \\ c_1 & b_2 & a_3 \end{pmatrix} \begin{pmatrix} 0 \\ 0 \\ -1 \end{pmatrix} = \begin{pmatrix} -c_1 \\ -b_2 \\ -a_3 \end{pmatrix} = \begin{pmatrix} 2ln \\ 2mn \\ -(1-2n^2) \end{pmatrix} \quad (4)$$

is satisfied.

Herein, as an inclination angle of a deflection face is generalized to and defined as an angle θ and a rotational angle of a deflector is an angle φ, a direction cosine (l, m, n) of a normal line of a mirror plane in such a case is represented by the following formula (5):

$l = \cos\theta \sin\phi$ $m = \sin\theta$ $n = \cos\theta \cos\phi$ \quad (5)

Due to the above-mentioned formula (4) and formula (5), a direction cosine of a reflected light ray is represented by the following formula (6):

$$\begin{pmatrix} L_1 \\ M_1 \\ N_1 \end{pmatrix} = \begin{pmatrix} \cos^2\theta \sin 2\phi \\ \sin 2\theta \cos\phi \\ -(1 - 2\cos^2\theta \cos^2\phi) \end{pmatrix} \quad (6)$$

Due to direction cosine components of a reflected light ray as obtained from the above-mentioned formula (6), an output angle of a laser light beam from a deflection face in a horizontal direction is represented by the following formula (7):

An output angle in a horizontal direction = \quad (7)

$$\tan^{-1}\left(\frac{L_1}{N_1}\right) = \tan^{-1}\left(\frac{-\cos^2\theta \sin 2\phi}{1 - 2\cos^2\theta \cos^2\phi}\right)$$

and an output angle thereof in a vertical direction is represented by the following formula (8):

An output angle in a vertical direction $= 90° - \cos^{-1}(M_1) = 90° - \cos^{-1}(\sin 2\theta \cos\phi)$ \quad (8)

From the above-mentioned formula (7), an output angle in a horizontal direction is generally twice (2φ) a rotational angle φ of a deflector in a case where a value of an inclination angle θ of a deflection face is small.

Furthermore, from the above-mentioned formula (8), an output angle in a vertical direction is a value close to twice (2θ) an inclination angle θ of a deflection face in a case where a rotational angle φ of a deflector is small, but decreases while increasing a rotational angle φ. That may be caused by a fact that an angle of a laser light beam incident on a deflection face increases while increasing a rotational angle φ of a deflector.

Thus, when a rotational angle φ of a deflector increases, that is, when a range of scanning in a horizontal direction is extended, an output angle in a vertical direction may decrease while increasing a rotational angle φ, by setting an inclination angle θ of a deflection face with respect to an axis line of a rotation axis, thereby an irradiation range for a laser light beam may be limited and a range of measurement on an object may be reduced.

Figure 16A:
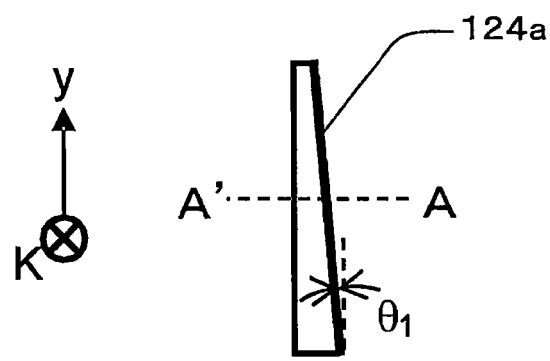
FIG. 16A and FIG. 16B are diagrams illustrating a deflection mirror in a third embodiment.
Figure 16B:
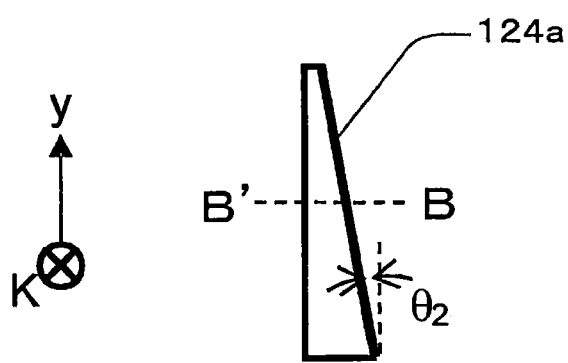

FIG. 16A illustrates a cross-sectional view in a line A-A' of FIG. 15A and FIG. 16B illustrates a cross-sectional view in a line B-B' of FIG. 15A. Additionally, any of a cross-section A-A' and a cross-section B-B' is orthogonal to a K-axis.

As illustrated in FIG. 16A and FIG. 16B, an inclination angle θ2 in a cross-section in a line B-B' is greater than an inclination angle θ1 in a cross-section in line A-A'. Then, an inclination angle θ in a cross-section between a cross-section in line A-A' and a cross-section in a line B-B' and orthogonal to a K-axis is set at a preferable value in a range of θ1≤θ≤θ2. Specifically, an inclination angle θ is set so as to, for example, increase at −K side. Additionally, although an inclination angle θ of a first deflection face has been described herein, an inclination angle of a second deflection face is also set similarly.

As seen from formula (8), it may only be necessary that sin 2θ·cos θ is retained at a constant in order to retain an output angle in a vertical direction at a constant. Herein, it may be possible to change a value of an inclination angle θ of a deflection mirror depending on a change in a rotational angle φ of the deflector 120 so as to make an output angle in a vertical direction be constant regardless of a rotational angle φ of the deflector 120. As a result, it may be possible to suppress reduction of an output angle in a vertical direction while increasing a rotational angle φ of the deflector 120.

Herein, a position of incidence of a laser light beam on a deflection mirror with respect to a direction of a K-axis is changed with rotation of the deflector 120. Specifically, as illustrated in FIG. 15A, a laser light beam from the light source device 10 is incident on a first deflection mirror 124a at a position P and at an angle of incidence ε1 when a rotational angle of the deflector 120 is φ1. Furthermore, as illustrated in FIG. 15B, a laser light beam from the light source device 10 is incident on a first deflection mirror 124a at a position Q (a position at a −K side of position P) and at an angle of incidence ε2 (>ε1) when a rotational angle of the deflector 120 is φ2 (>φ1). That is, it is seen that, due to rotation of the deflector 120, an angle of incidence of a laser light beam on a deflection mirror is increased and a position of incidence thereon is shifted toward a −K direction.

Hence, in the third embodiment, an inclination angle θ is set in such a manner that sin 2θ·cos θ is constant, individually for a position of incidence of a laser light beam on a deflection mirror depending on a rotational angle φ of the deflector 120.

Figure 17:
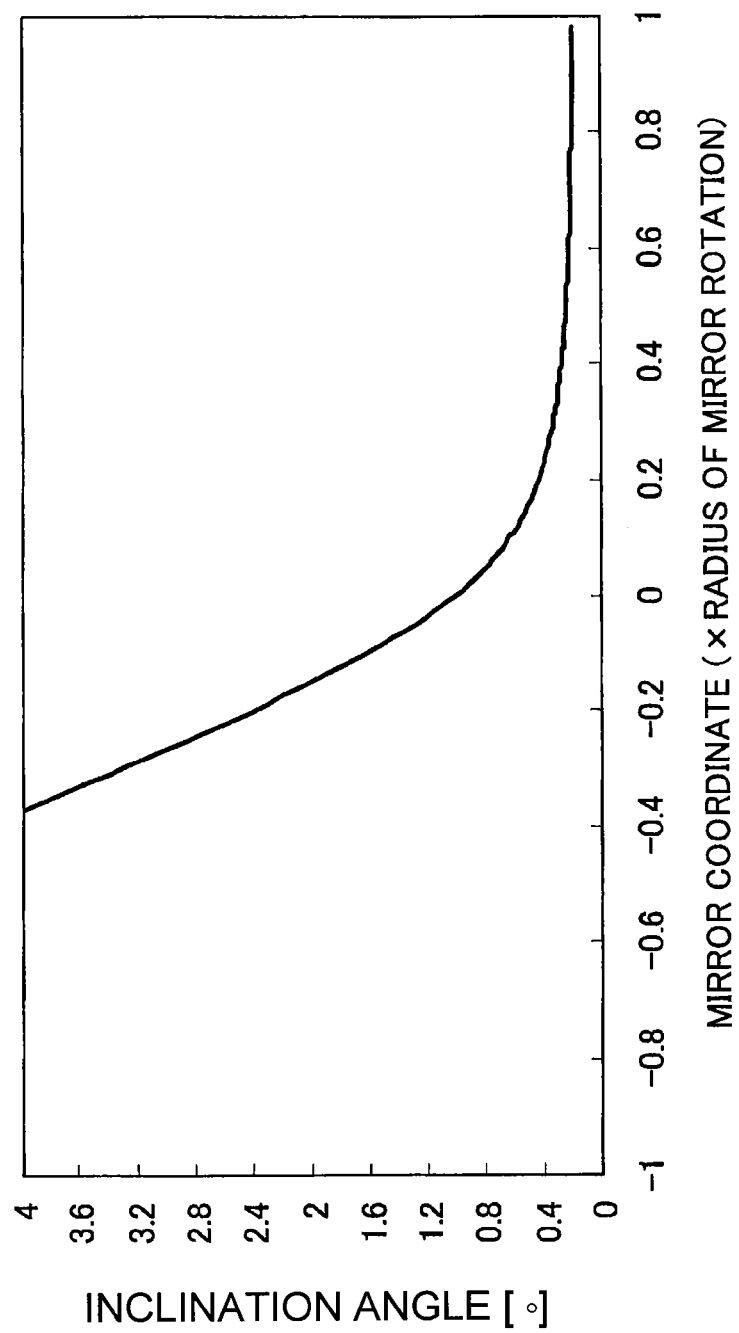
FIG. 17 is a graph illustrating a relationship between a mirror coordinate of a deflection mirror and an inclination angle thereof in a third embodiment.

FIG. 17 illustrates an example of setting of an inclination angle of a deflection face of a deflection mirror with respect to each mirror coordinate (K-coordinate) in a graph. Herein, an inclination angle is set individually for each K-coordinate on a deflection face in such a manner that an output angle of a laser light beam in a vertical direction is constantly provided with an offset of 0.4° by a deflection mirror, independently of a rotational angle of the deflector 120, that is, a deflection angle of a laser light beam in a horizontal direction. Additionally, a value normalized by a radius of rotation of a deflection mirror (mirror radius), that is, a distance between a deflection mirror and a rotation axis, is provided on a transverse axis in FIG. 17 as a K-coordinate. Herein, a mirror coordinate of −0.4 corresponds to a K-coordinate of a cross-section B-B' and a mirror coordinate of 1 corresponds to a K-coordinate of a cross-section A-A'. Then, it is seen from FIG. 17 that an inclination angle on the first deflection mirror 124a increases at −K side, wherein an inclination angle on the first deflection mirror 124a at position Q is greater than an inclination angle at position P.

Additionally, in FIG. 7 and FIG. 8 which have already been referred to, spread angles of laser light beams LB1 and LB2 deflected by each deflection mirror in a vertical direction are set at 0.8°, wherein each irradiation area is illustrated based on a case where an ideal laser light beam having no width in a horizontal direction is used.

It is seen from FIG. 7 that an output angle in a vertical direction is constantly provided with an offset of +0.4° by a first deflection mirror, independently of an output angle in a horizontal direction. As a result, irradiation areas L1 and L3 are scanned with laser light beams LB1 and LB2, respectively, in a horizontal direction.

It is seen from FIG. 8 that an output angle in a vertical direction is constantly provided with an offset of −0.4° by a second deflection mirror, independently of an output angle in a horizontal direction. As a result, irradiation areas L2 and L4 are scanned with laser light beams LB1 and LB2, respectively, in a horizontal direction.

According to the third embodiment, it may be possible to scan each of four irradiation areas L1-L4 with light at a desired irradiation width with respect to a direction of a Z-axis, independently of a rotational angle of the deflector 120.

Plural variation examples of an embodiment of the present invention will be described below. In each variation example described below, members different from those of each of the above-mentioned embodiments will be mainly described and a member having a configuration similar to that of each of the above-mentioned embodiments will be provided with an identical reference numerals and descriptions omitted thereof.

A First Variation Example

A first variation example will be described based on FIG. 18 and FIG. 19, below. In the first variation example, a configuration of a light source device is different from that of each of the above-mentioned embodiments.

Figure 18:
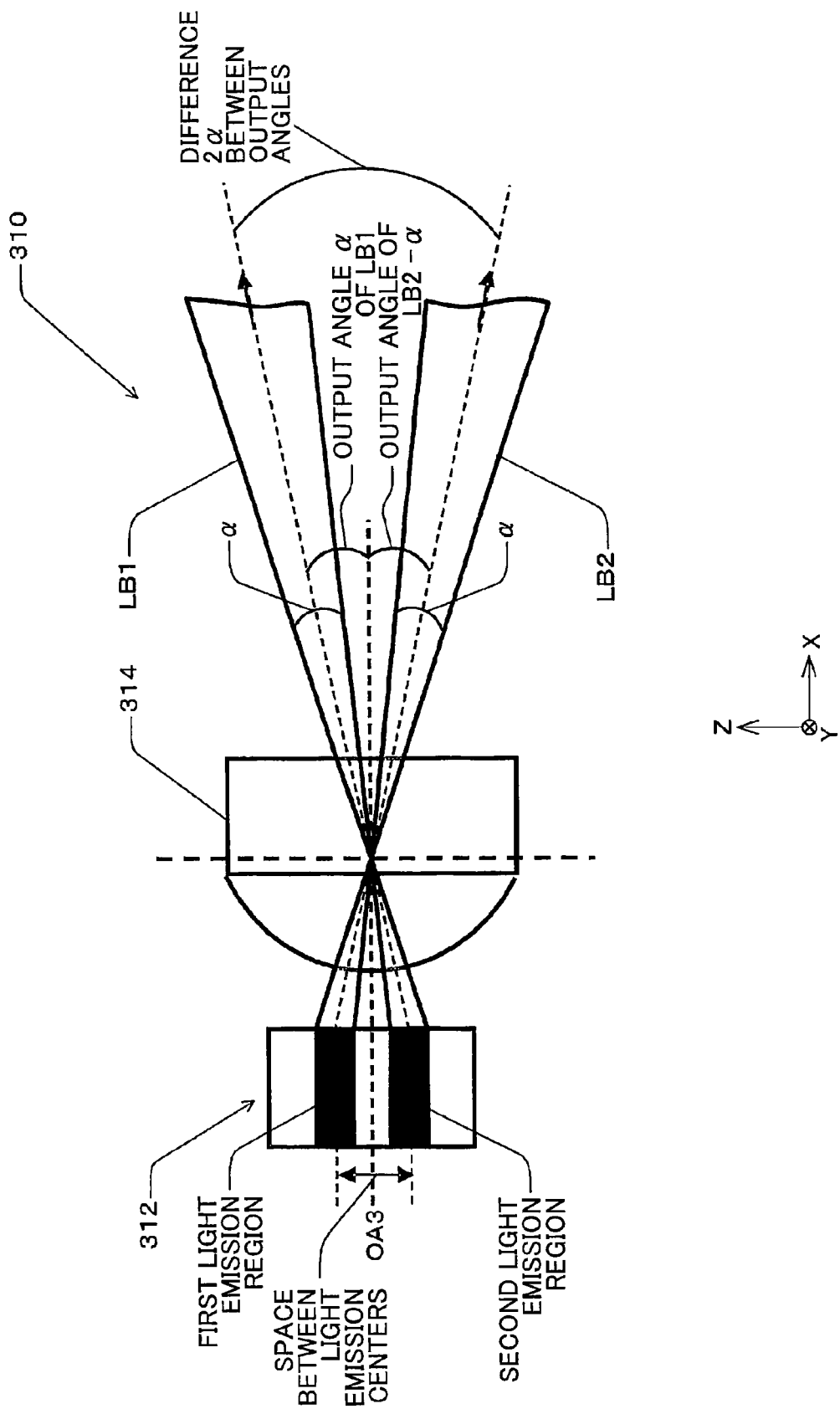
FIG. 18 is a diagram illustrating a light source device in a first variation example (part 1).

As illustrated in FIG. 18, a light source device 310 in the first variation example includes one light source 312 having plural (for example, two) light emission regions, one coupling lens 314, etc.

Figure 19:
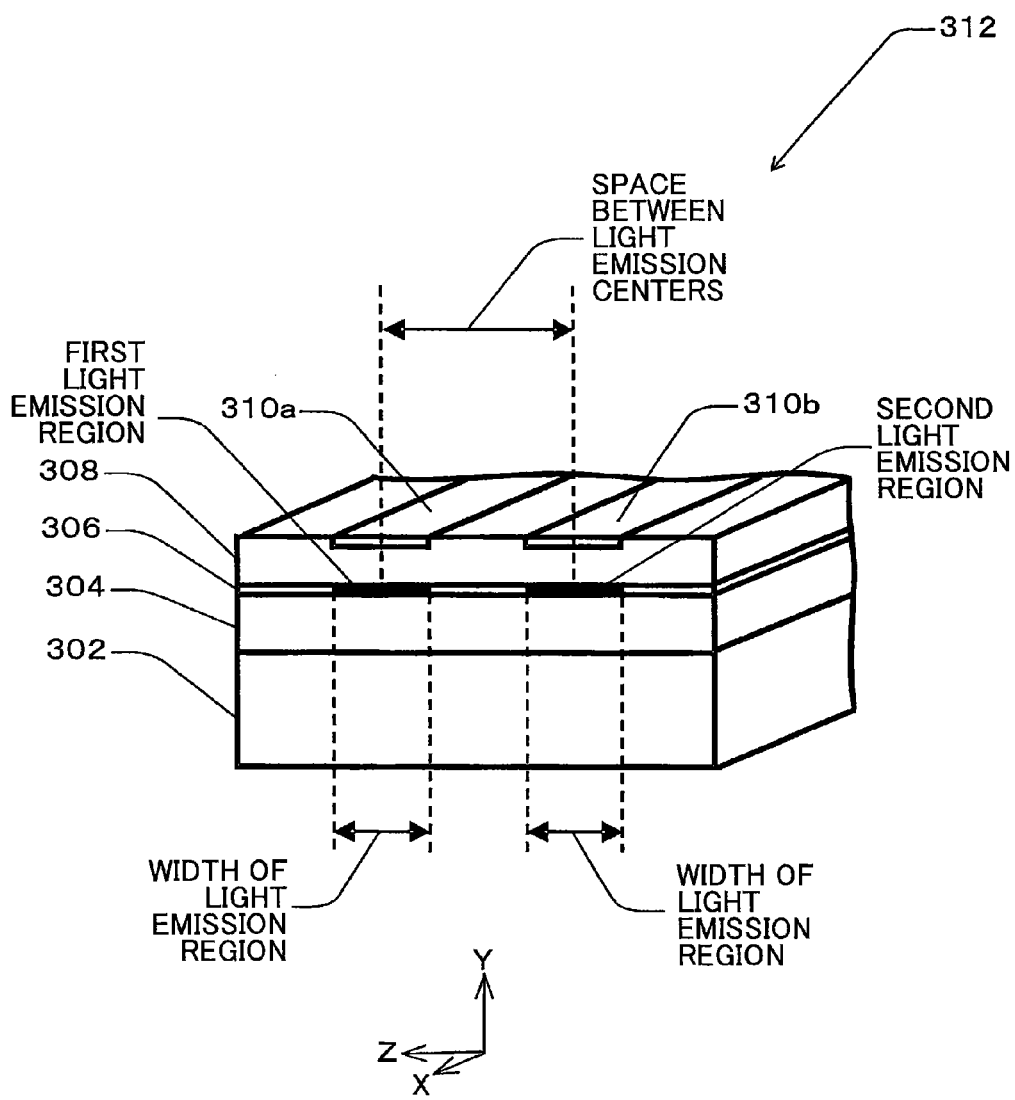
FIG. 19 is a diagram illustrating a light source in a first variation example (part 1).

As illustrated in FIG. 19, by way of example, the light source 312 is a semiconductor laser element composed of a laminate in which a substrate 302, an n-cladding layer 304, an active layer 306, and a p-cladding layer 308 are laminated in such an order from a −Y side to a +Y side.

On a top of the p-cladding layer 308, two p-electrodes 310a and 310b are loaded so as to be separated in a direction of a Z-axis, and as an electric current is injected via each p-electrode, a region of the active layer which corresponds to the p-electrode emits light. Such a region is a light emission region. That is, light emission regions corresponding to respective p-electrodes are juxtaposed in a direction of a Z-axis. A width of each light emission region in a direction of a Z-axis (a direction parallel to a substrate surface) (which may also be referred to as a "light emission region width", below) is generally equal to a width of a corresponding p-electrode in a direction of a Z-axis (which may also be referred to as an "electrode width", below), wherein it may be possible to adjust an electrode width of the p-electrode so as to adjust a light emission region width of the light emission region.

That is, the light source 312 is an edge-emitting-type semiconductor laser (which may also be referred to as an "edge-emitting laser", below) having plural (for example, two) light emission regions with large light emission region widths, wherein it may be possible to deliver a high power light pulse.

Meanwhile, a high angular resolution is generally desired for a distance measuring device with respect to scanning with light in a horizontal direction.

Accordingly, the light source 312 is arranged in such a manner that a direction in which a width of each light emission region is larger is a direction of a Z-axis and a direction in which a width of such a light emission region is smaller is a direction of a Y-axis. In such a case, each light emission region emits light on an YZ-plane so that a laser light beam is emitted in a +X direction. As a result, it may be possible to use a good beam quality component having a small light emission region width and emitted in a direction perpendicular to a substrate surface (a direction of a Y-axis), among laser light beams, for scanning in a horizontal direction and use a component having a large light emission region width and emitted in a direction parallel to a substrate surface (a direction of a Z-axis) for deflection in a perpendicular direction.

It may be possible to adjust an electrode width of each p-electrode and a gap between two p-electrodes so as to adjust a light emission region width of each light emission region and a gap between centers of two light emission regions (which may also be referred to as "light emission center gap", below). Then, it may be possible to increase the number of p-electrodes loaded in parallel so as to readily increase the number of light emission regions. Furthermore, it may be possible to control electric current signals inputted into two p-electrodes independently so as to make timings of light emission of two light emission regions be different.

As described above, the light source 312 is arranged in such a manner that two light emission regions are separated in a direction of a Z-axis and a direction of emission of each light emission region is a +X direction, as illustrated in FIG. 19. By way of example, a plano-convex lens is adopted for the coupling lens 314. The coupling lens 314 is arranged in such a manner that an optical axis OA3 thereof passes through a center of a region (non-light emission region) between two light emission regions in a direction of a Z-axis and is parallel to an X-axis. Among two light emission regions, a light emission region at a +Z side may also be referred to as a "first light emission region" and a light emission region at a –Z side may also be referred to as a "second light emission region", below. A laser light beam is emitted from a first light emission region at an output angle of –α and a laser light beam is emitted from a second light emission region at an output angle of +α.

A laser light beam emitted from a first light emission region at an output angle of –α enters the coupling lens 314 at a +Z side of an optical axis OA3 of the coupling lens 314, intersects with the optical axis OA3, and then, exits at an output angle of –α and a spread angle α, and hence, it may be possible to be used as a laser light beam LB2. On the other hand, a laser light beam emitted from a second light emission region at an output angle of +α enters the coupling lens 314 at a –Z side of an optical axis OA3 of the coupling lens 314, intersects with the optical axis OA3, and then, exits at an output angle of +α and a spread angle α, and hence, it may be possible to be used as a laser light beam LB1. Then, there is a non-emission region in which a laser light beam is not emitted between laser light beams LB1 and LB2.

As seen from the above-mentioned formula (2), it may be possible to adjust a spread angle of a laser light beam by a light emission region width and a focal length of a coupling lens. Furthermore, as seen from the above-mentioned formula (1), it may be possible to adjust a difference between output angles of laser light beams of a light emission center gap between plural light emission regions and a focal length of a coupling lens.

For specific examples of numerical values, as a light emission width of two light emission regions of the light source 312, a light emission center gap, and a focal length of the coupling lens 314 are 80 μm, 160 μm, and 5.7 mm, respectively, each of spread angles of laser light beams LB1 and LB2 is 0.8° and a difference between output angles thereof is 1.6°, so that a measuring range (irradiation range) of an object in a vertical direction which is 3.2° is divided into four regions and measured, and thereby, it may be possible to produce preferable laser light beams.

Herein, a light emission center gap is determined by a gap between the two p-electrodes 310a and 310b, and hence, it may be possible to be reduced by generally twice of a light emission region width. In such a case, it may be possible to provide one semiconductor laser element with plural adjacent light emission regions and it may be possible to arrange each light emission region and the coupling lens 314 with an identical amount of offset in mutually different directions (opposite directions) parallel to a direction orthogonal to an optical axis thereof (a direction of a Z-axis) by merely arranging one coupling lens 314 for a semiconductor laser element. As a result, it may be possible for only one semiconductor laser element and one coupling lens to produce two laser light beams separated in a direction of a Z-axis so that it may be possible to attain miniaturization and cost reduction of a device.

A Second Variation Example

In a second variation example, a configuration of a light source is different from that of the first variation example.

Figure 20:
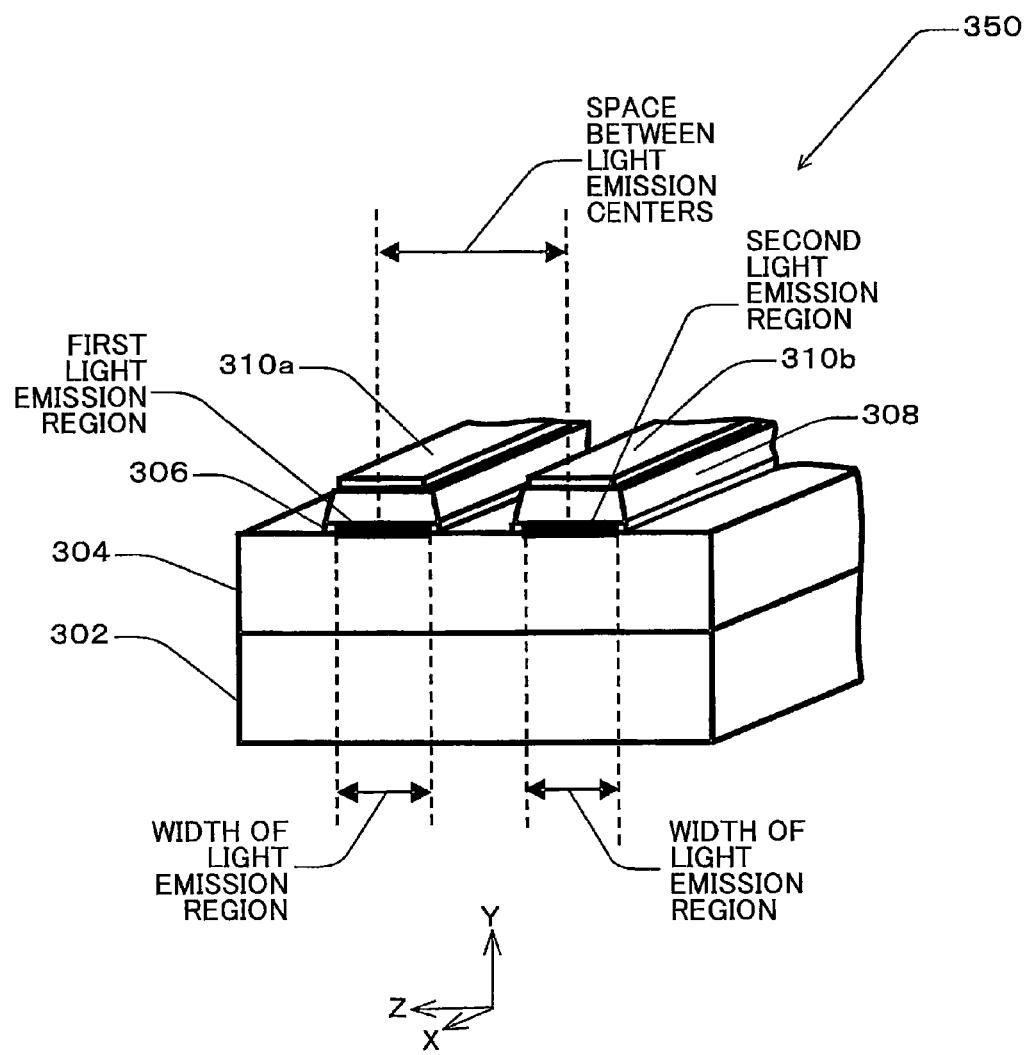
FIG. 20 is a diagram illustrating a light source in a first variation example (part 2).

FIG. 20 illustrates a light source 350 in the second variation example in a perspective view. The light source 350 has a structure provided by applying ridge processing to the light source 312 in the first variation example (see FIG. 19) in such a manner that regions at a +Z side and a –Z side of each light emission region in the active layer 306 and a region at +Z side and a +Y side and a region at a –Z side and a +Y side of each light emission region in the p-cladding layer 308 are eliminated so that side faces of each light emission region at a +Z side and a –Z side contact air.

Meanwhile, a spread angle of a laser light beam is determined by a light emission region width, and hence, it may be important to define a light emission region width precisely in order to suppress crosstalk among measurement regions (irradiation areas) in a case where a measurement range (irradiation range) on an object is divided in a vertical direction. In an edge-emitting laser in the first variation example as illustrated in FIG. 19, an electron injected from each p-electrode may be diffused in a direction parallel to a substrate (a direction of a Z-axis) until arriving at the active layer 306, and hence, a light emission region width of a light emission region corresponding to an electrode width of a p-electrode may be extended slightly.

Furthermore, leakage of light from a light emission region to a non-light-emission region may be caused by such diffusion of an electron so that a boundary between a light emission region and a non-light-emission region may be unclear, and hence, it may be difficult to define a light emission region width precisely.

Hence, faces of each light emission region at a +Z side and a –Z side contact air with a smaller refractive index in an edge-emitting laser in the above-mentioned second variation example, so that a larger refractive index difference is provided, between a face of a light emission region at a +Z side and a region adjacent to the face, and between a face of a light emission region at a –Z side and a region adjacent to the face. Due to such a refractive index difference, laser light is firmly confined inside each light emission region so that it may be possible to suppress leakage of laser light to the exterior of the light emission region. As a result, it may be possible to define a light emission region width of each light emission region of the light source 350 precisely, and as a result, it may be possible to suppress crosstalk among measurement regions.

Herein, it may be possible to utilize general dry-etching or wet-etching as a method for eliminating the active layer 306 except in a light emission region as illustrated in FIG. 20. In either case, it may be possible to protect an active layer on a bottom of a p-electrode and eliminate a residual cladding material and active layer, while each p-electrode is a mask.

Furthermore, etching has even been applied to the active layer 306 in FIG. 20 but ridge processing may be applied to reach the n-cladding layer 304 by controlling an etching condition. Furthermore, it may be effective not to apply etching to the active layer 306 but to make only the p-cladding layer 308 be a ridge shape, so as to form a so-called "ridge waveguide structure", and to increase only an equivalent refractive index of each light emission region in the active layer 306.

Moreover, after the ridge processing is applied, a material with a low refractive index, for example, $SiO_2$, a polymer material, etc., may be embedded in regions at +Z side and a –Z side of each light emission region. In such a case, it may be possible to confine laser light inside a light emission region and protect the light emission region on a condition that a refractive index difference between each light emission region and an exterior of the light emission region is retained at a predetermined value.

A Third Variation Example

A third variation example (part 1 and part 2) will be described based on FIG. 21 and FIG. 22, below.

In the third variation example (part 1 and part 2), a configuration of a light source device is different from those of each of the above-mentioned embodiments and each of the above-mentioned variation examples.

Figure 21:
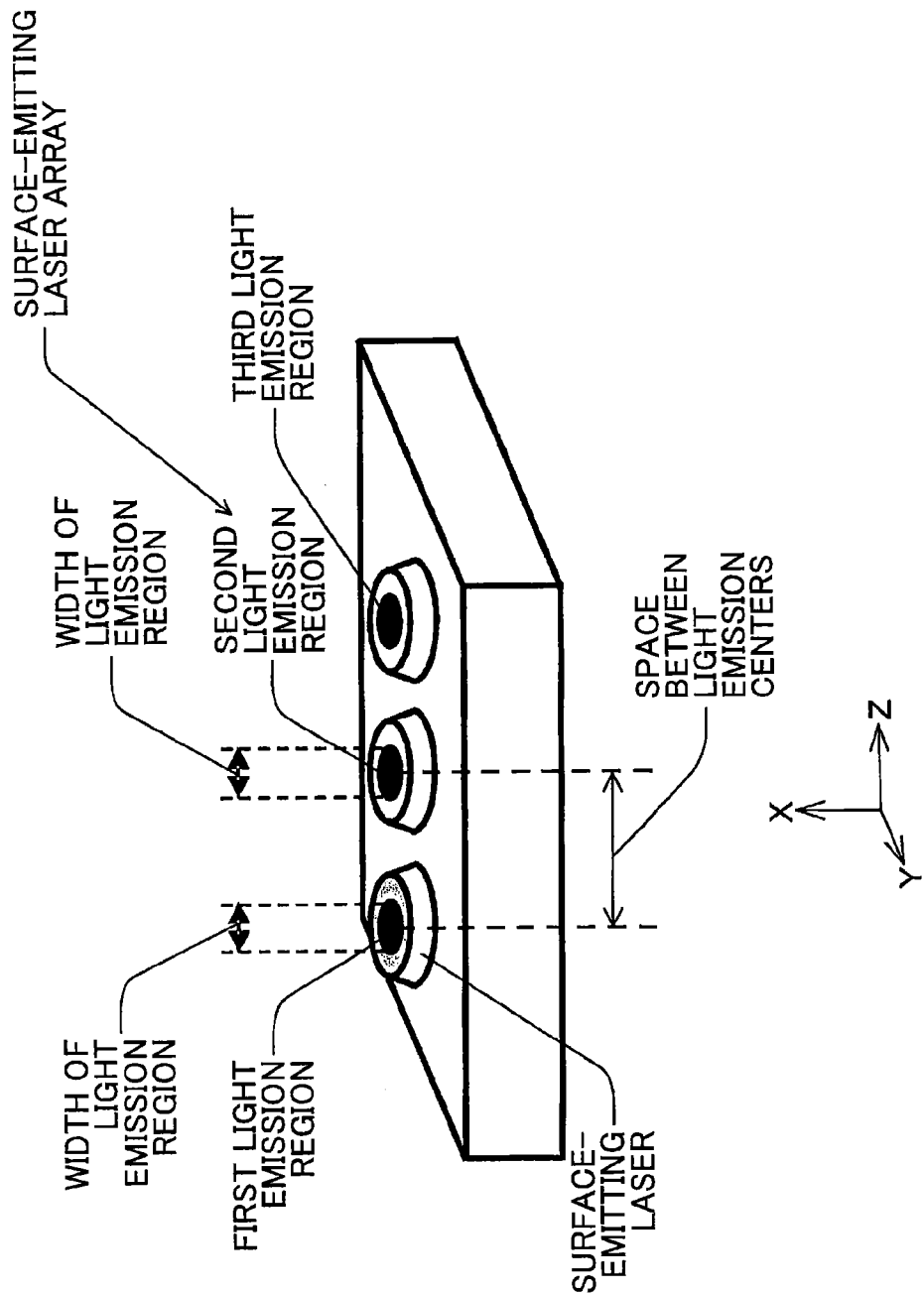
FIG. 21 is a diagram illustrating a light source in a second variation example.

As illustrated in FIG. 21, a light source device in the third variation example (part 1) includes one surface-emitting type laser array element (which may also be referred to as a "surface-emitting laser array") having plural (for example, three) surface-emitting lasers (VCSEL) arrayed in a direction of a Z-axis.

A surface-emitting laser array is a laser which resonates laser light in a vertical direction with respect to a substrate surface and emits in a vertical direction with respect to such a substrate surface, wherein plural light emission regions are readily arranged adjacently due to structures thereof. Furthermore, a light profile of a laser light beam emitted from each light emission region is a nearly completely round as compared to an edge-emitting laser, so that a beam quality is good. Moreover, it may be possible to form a resonator or check a laser characteristic without cleaving a substrate in a manufacturing process and have an excellent characteristic such as being suitable for mass production.

Accordingly, a surface-emitting laser array is adopted as a light source for a distance measuring device according to an embodiment of the present invention so that it may be possible to readily form plural light emission regions and set a light emission region width of each light emission region and a gap between centers of two adjacent light emission regions (light emission center gap).

In the third variation example (part 1), light emission region widths of plural surface-emitting lasers are coincided and a light emission center gap is set at, for example, twice an emission region width, so that it may be possible to produce plural laser light beams suitable for an embodiment of the present invention by merely arranging one coupling lens behind a surface-emitting laser array.

Figure 22:
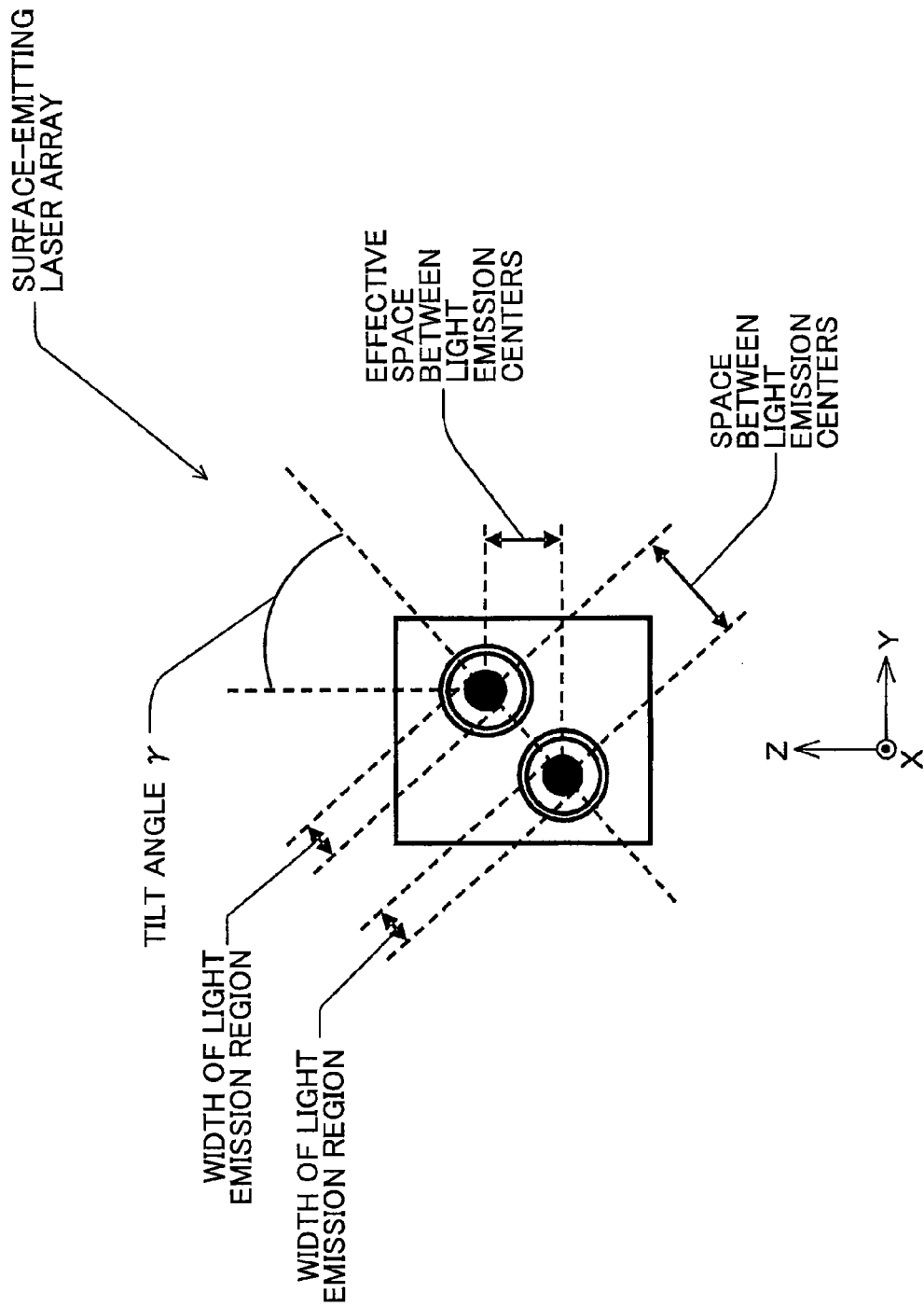
FIG. 22 is a diagram illustrating a light source in a third variation example.

Meanwhile, when it is difficult to arrange plural light emission regions adjacently due to a problem such as heat, etc., it may be possible to tilt by a tilt angle γ with respect to a direction parallel to an axial line of the rotation axis 22 (a direction of a Z-axis) and arrange plural light emission regions, like the third variation example (part 2) as illustrated in FIG. 22, so as to reduce an effective light emission center gap. A surface-emitting laser provides a light emission profile of a nearly complete round shape and emitted light spreading isotropically, and hence, even when a surface-emitting laser array is provided with a tilt angle, a spread angle of emitted light in a vertical direction may not be changed after passing through a coupling lens.

That is, in the third variation example (part 2), a rotational position of s surface-emitting laser array around an X-axis is adjusted to tilt a direction of arraying of plural light emission regions by a tilt angle γ with respect to a direction parallel to an axis line of the rotation axis 22 (a direction of a Z-axis), so that it may be possible to obtain a desired light emission center gap with respect to a direction of a Z-axis while separating two adjacent light emission regions in such a manner that it may be possible to ensure a reliability of a surface-emitting laser array element sufficiently. On the other hand, although a difference in an output angle of a laser light beam in a horizontal direction after passing through a coupling lens is produced between plural laser light beams, it may be possible to know an output angle difference preliminarily, and hence, it may be possible to conduct application of signal processing in view of an amount of such a difference to prevent erroneous sensing in a horizontal direction.

In the third variation example (part 1 and part 2), it may be possible to provide a surface-emitting laser array as a light source and thereby provide plural light emission regions on one element, and hence, it may be possible to emit plural laser light beams by only one coupling lens, so that it may be possible to attain miniaturization and cost reduction of a device.

A Fourth Variation Example

Figure 23:
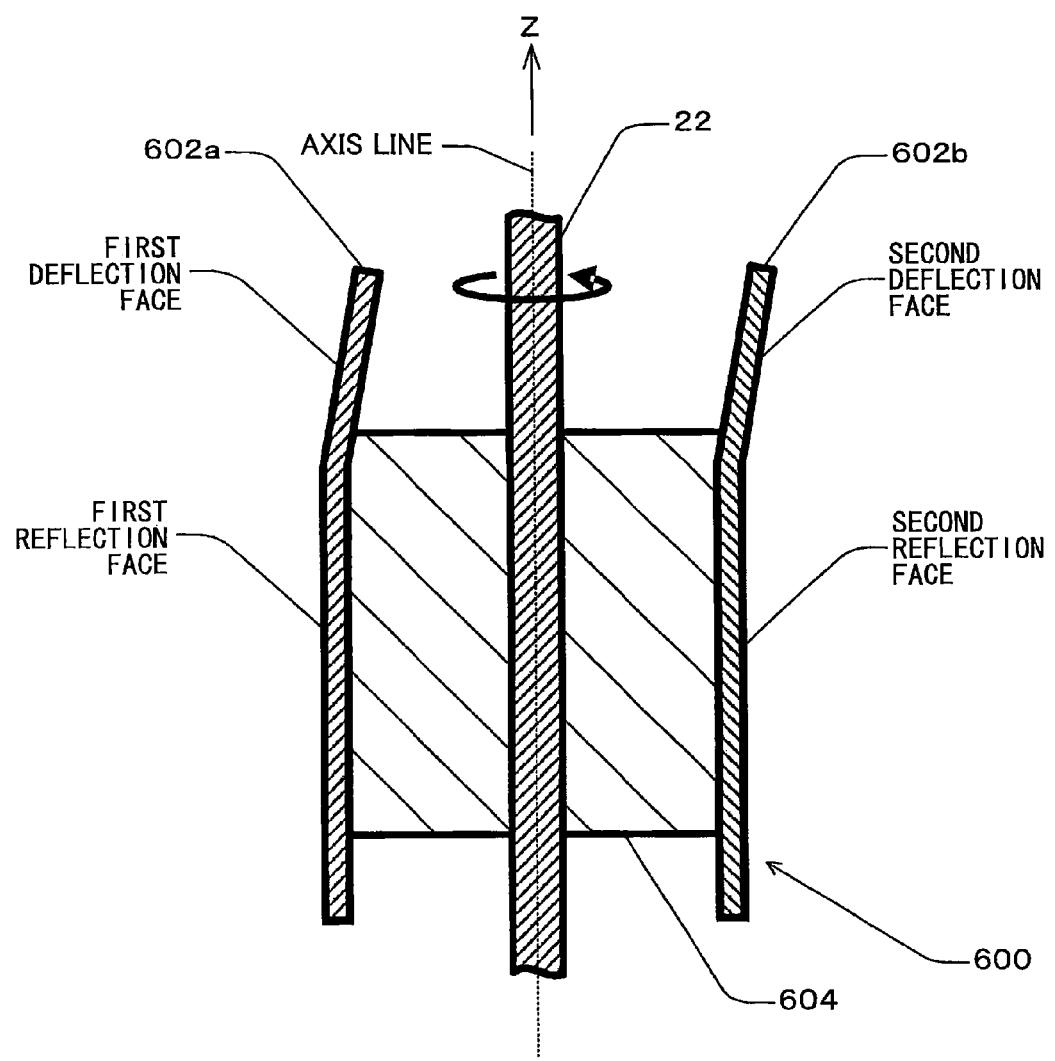
FIG. 23 is a diagram illustrating a deflection reflector in a fourth variation example.

A fourth variation example will be described based on FIG. 23, below. As illustrated in FIG. 23, a deflection reflector 600 having both functions of a deflector and a reflector is attached to the rotation axis 22 in the fourth variation example.

The deflection reflector 600 includes a first deflection reflector 602a provided by integrating a first deflection mirror and a first reflection mirror, a second deflection reflector 602b provided by integrating a second deflection mirror and a second reflection mirror, and a mirror base 604 having first and second deflection reflection mirrors 602a and 602b attached thereto and fixed on the rotation axis 22.

That is, the first deflection reflection mirror 602a has a first deflection face on a top thereof and a first reflection face on a bottom thereof. Furthermore, the second deflection reflection mirror has a second deflection face on a top thereof and a second reflection face on a bottom thereof.

An inclination angle of each of the first and second deflection faces with respect to an axis line of the rotation axis 22 is set to be identical to that of each of the above-mentioned embodiments. Furthermore, each of the first and second reflection faces is mutually parallel and is parallel to an axis line of the rotation axis 22, similarly to each of the above-mentioned embodiments.

Meanwhile, as seen from the above description(s), it may be necessary to coincide positions (rotational positions) of a deflection mirror and a reflection mirror around a Z-axis in order that a laser light beam enters the condenser lens 42 so as to be parallel to an optical axis thereof. Accordingly, in the fourth variation example, two deflection reflection mirrors provided by integrating a deflection mirror and a reflection mirror are attached to one mirror base, and hence, a positional difference between a deflection face and a corresponding reflection face may be prevented as compared to a case where a deflection mirror and a reflection mirror as separate bodies are attached to two mirror bases as separate bodies. Furthermore, it may be possible to suppress a difference in a rotational position around a Z-axis which may be caused when two mirror bases as separate bodies are attached to the rotation axis 22 and a positional difference in a direction of tilting (a direction tilting with respect to an XY-plane).

For example, it may be possible to manufacture two deflection faces with different inclination angled as illustrated in FIG. 23 at a surface precision which is a high precision, by a molding technique, etc., and it may also be easy to integrate a reflection mirror having a planar shape with each deflection face, so that it may be possible to adjust a shape of a face of an integrated deflection reflection mirror so as to control rotational positions of a deflection face and a reflection face corresponding thereto at a high precision.

A Fifth Variation Example

Figure 24:
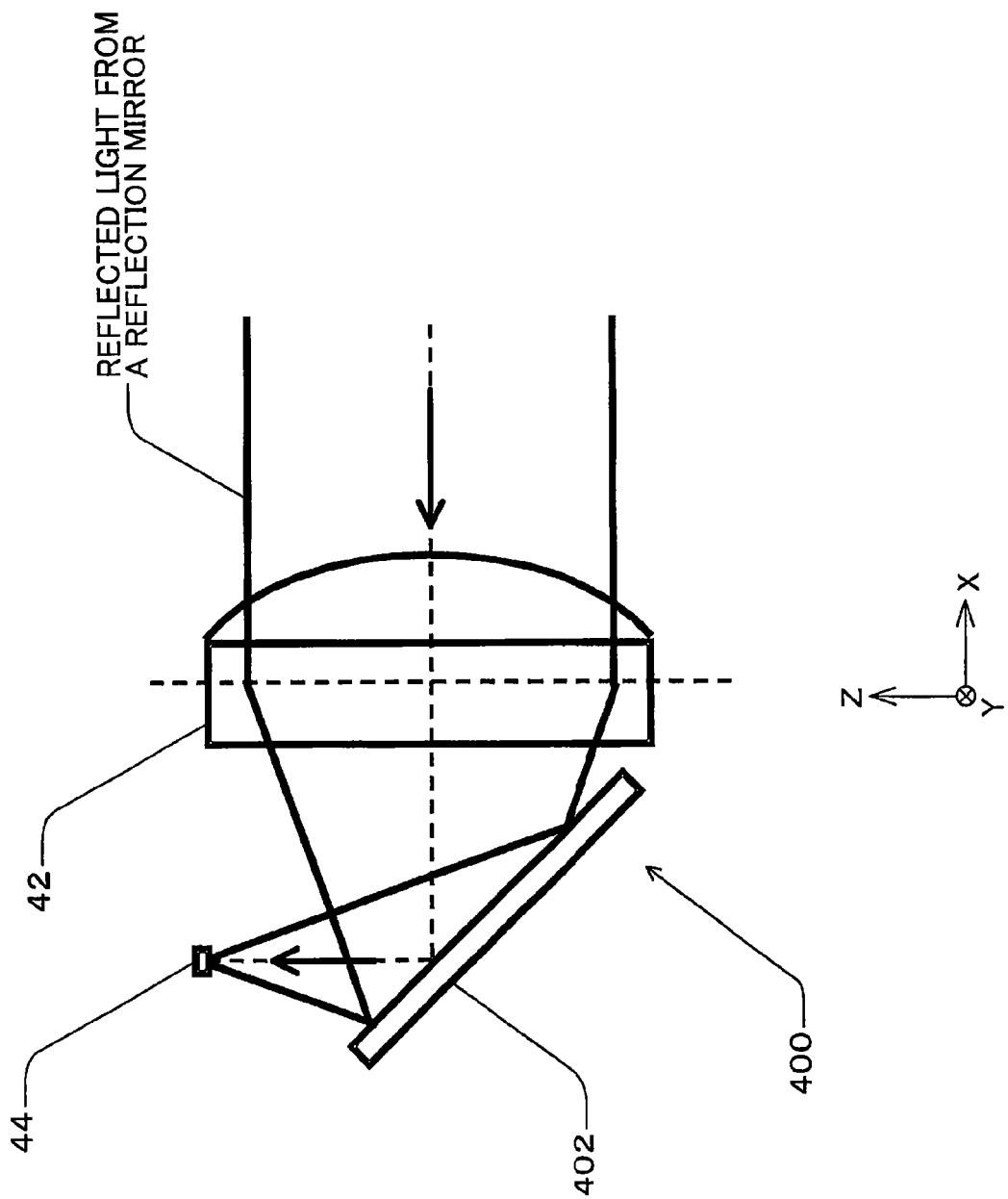
FIG. 24 is a diagram illustrating a light-receiving part in a fifth variation example.

In a fifth variation example, a configuration of a light-receiving part is different from that of each of the above-mentioned embodiments and each of the above-mentioned variation examples, as illustrated in FIG. 24.

A light-receiving part 400 in the fifth variation example includes a mirror member 402 for reflecting a laser light beam reflected by an object and passed via one reflection mirror and the condenser lens 42 toward the light-receiving element 44, in addition to the condenser lens 42. That is, in the fifth variation example, the light-receiving element 44 is located at a position deviating from an optical path of a laser light beam via the condenser lens 42 (for example, at a +Z side of an optical axis of the condenser lens 42).

Meanwhile, a laser light beam from a light source device is scattered by an object toward various directions and only a laser light beam returning to one reflection mirror through an optical path which is generally identical to an optical path of incidence on an object enters the condenser lens 42. In such a case, a portion of diffused light reflected by one reflection mirror enters the condenser lens 42, and hence, a laser light beam passes through an entirety of an effective range of the condenser lens 42. Accordingly, the condenser lens 42 may be required to eliminate a spherical aberration thereof, and it is desirable that an entering face (curved face) of the condenser lens 42 has an aspheric shape.

Furthermore, a portion of reflected light from an object passes through the condenser lens 42, and subsequently, a direction of traveling thereof is changed (reflected) by the mirror member 402 to be guided to the light-receiving element 44. In such a case, it may be possible to reduce a space for placement of a light-receiving part, and thereby, attain miniaturization of a device.

A Sixth Variation Example

Figure 25:
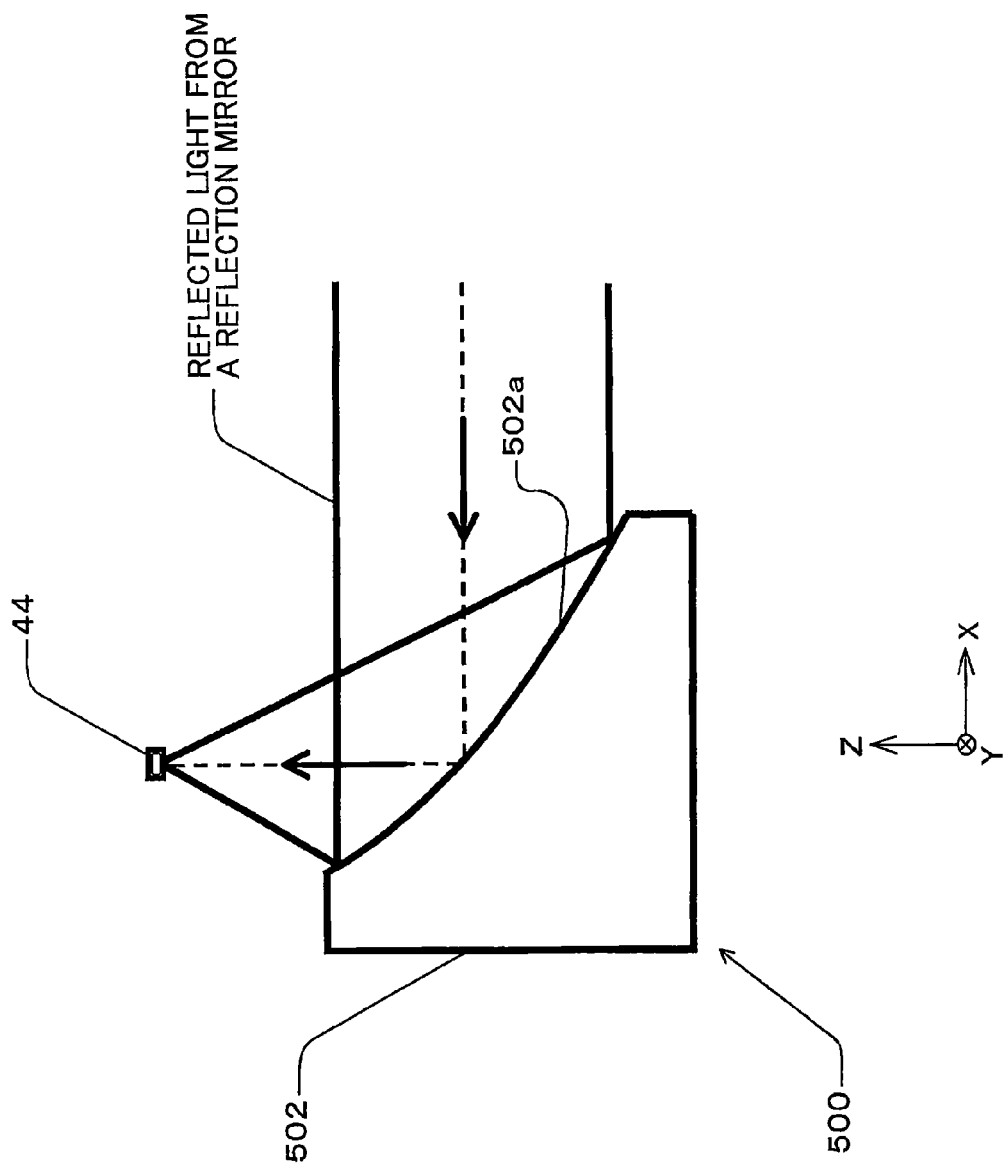
FIG. 25 is a diagram illustrating a light-receiving part in a sixth variation example.

In a sixth variation example, a configuration of a light-receiving part is difficult from that of the above-mentioned fifth variation example, as illustrated in FIG. 25.

A light-receiving part 500 in the sixth variation example includes a condenser mirror 502 having both functions of the condenser lens 42 and the mirror member 402 in the fifth variation example. The condenser mirror 502 has a concave curved mirror 502a, wherein reflected light from one reflection mirror is reflected by the concave curved mirror 502 toward the light-receiving element 44 and condensed on the light-receiving element 44.

In such a case, it may be possible to reduce the number of components of a light-receiving part 500 as compared to the fifth variation example, and it may be possible to readily position such components.

The present invention is not limited to each of the above-mentioned embodiments or each of the variation examples, and it is possible to apply various modifications thereto.

In each of the above-mentioned embodiments or each of the variation examples, a light source device includes plural light-emitting parts but may have only one thereof. In such a case, a light source device may guide one laser light beam emitted from one light-emitting part to a first or second deflection face. As a result, it may be possible to scan each of two irradiation areas juxtaposed in a direction of a Z-axis of an object in a horizontal direction. Furthermore, a light source device may divide one laser light beam emitted from one light-emitting part into N (N≥2) laser light beams separated in a direction of a Z-axis, for example, by using at least one light beam dividing element such as a beam splitter, a half mirror, a prism, or a dichroic mirror, and guide divided N laser light beams to a first or second deflection face. As a result, it may be possible to scan each of N×2 irradiation areas juxtaposed in a direction of a Z-axis of an object in a horizontal direction.

Additionally, "N laser light beams separated in a direction of a Z-axis" may be mutually angled or may be mutually parallel.

In each of the above-mentioned embodiments or each of the variation examples, a deflector (or deflection reflector) includes each of two defection faces and reflection faces but may include each of three or more thereof. In such a case, however, it may be necessary that inclination angles of respective deflection faces with respect to an axis line of the rotation axis 22 are mutually different.

In each of the above-mentioned embodiments or each of the variation examples, two reflection faces of a reflector (or deflection reflector) are mutually parallel and are parallel to an axis line of the rotation axis 22 but are not limited thereto, wherein, essentially, it may only be necessary to arrange each of two reflection faces in such a manner that a portion of a laser light beam deflected by a corresponding deflection face and reflected by an object is guided to a condenser element (the condenser lens 42 or the condenser mirror 502). In such a case, at least one optical member for guiding a laser light beam reflected by one reflection face to a condenser element may be provided additionally. Furthermore, arrangement of a condenser element may be changed depending on arrangement of each reflection face.

In each of the above-mentioned embodiments or each of the variation examples, an axis line of the rotation axis 22 is parallel to a Z-axis but may be, for example, parallel to one axis intersecting with a Z-axis, such as an X-axis or Y-axis. In such a case, however, it may be necessary to arrange a light source device, a deflector and a reflector (or a deflection reflector), a light-receiving part, the driving device 21, and a measurement processing device, depending on a direction of extending of an axis line of the rotation axis 22.

In each of the above-mentioned embodiments or each of the variation examples, values and directions of inclination angles of first and second deflection faces with respect to an axis line of the rotation axis 22 are identical and different, respectively, but are not limited thereto, wherein, for example, values and directions of the inclination angles may be different and identical, respectively, or both values and directions of the inclination angles may be different, wherein, essentially, it may only be necessary for the inclination angles to be mutually different. In such a case, optical paths of plural laser light beams from first and second deflection faces may overlap mutually with respect to a direction of a Z-axis or a gap may be produced between optical paths of two adjacent laser light beams, among plural laser light beams juxtaposed in a direction of a Z-axis from first and second deflection faces.

In each of the above-mentioned embodiments or each of the variation examples, a measurement range (irradiation range) of an object is divided into four in a vertical direction by using two laser light beams LB1 and LB2 which travel on two optical paths separated in a direction of a Z-axis, respectively, and two deflection mirrors (or deflection reflection mirrors) with mutually different inclination angles, but such a measurement area may be divided into more or less parts in a vertical direction.

That is, in a distance measuring device according to an embodiment of the present invention, it may be possible to use plural laser light beams which travel on plural optical paths separated in a direction of a Z-axis, respectively, or one laser light beam and plural deflection mirrors (or deflection reflection mirrors) with mutually different inclination angles so as to divide a measurement range (irradiation range) of an object into plural parts in a vertical direction, and it may be possible to make the number of a light-emitting element(s)

less than or equal to the number of a laser light beam(s). Then, when a light source device includes plural light-emitting parts, it may be possible to reduce the number of a light-emitting element(s) due to mutually different timings of light emission of the plural light-emitting parts. Additionally, it may be possible to adjust the number of the laser light beam(s) by, for example, increasing or decreasing the number of a light-emitting part(s) or light emission region(s) of a light source, or dividing a light beam from a light source into plural light beams using the above-mentioned at least one light beam dividing element.

Specifically, three laser light beams which travel on three optical paths separated in a direction of a Z-axis, respectively, and two deflection mirrors (or deflection reflection mirrors) with mutually different inclination angles may be used. In such a case, it may be possible to divide a measurement range into six in a vertical direction. In such a case, when a light source device includes three light-emitting parts which emit laser light beams, respectively, it may be possible for six laser light beams to be incident on a light-receiving element at different timings due to mutually different timings of light emission of the three light-emitting parts, and hence, one light-receiving element may be sufficient.

Furthermore, it may also be possible to use two laser light beams which travel on two optical paths separated in a direction of a Z-axis, respectively, and three deflection mirrors (or deflection reflection mirrors) with mutually different inclination angles so as to divide a measurement range into six in a vertical direction. In such a case, spread angles of two laser light beams are equal and a difference between output angles of two laser light beams is set at three times a spread angle of each laser light beam, while a spread angle of a non-emission region between optical paths of the two laser light beams is set at twice a spread angle of each laser light beam. Then, it may be preferable to set inclination angles of three deflection mirrors in such a manner that, in a region between optical paths of two laser light beams from one deflection mirror, an optical path of one laser light beam from each of other two deflection mirrors (or deflection reflection mirrors) is located adjacently in a direction of a Z-axis. As a result, it may be possible to mutually interpolate a region between optical paths of two laser light beams from each of three deflection mirrors (or deflection reflection mirrors).

That is, respective spread angles of plural laser light beams on optical paths separated in a direction of a Z-axis are mutually equal and a spread angle of a region between optical paths of two laser light beams on adjacent optical paths among the plural laser light beams is an integral multiple of a spread angle of each of the plural laser light beams. Then, it may only be necessary to set inclination angles of plural deflection faces in such a manner that, in a region between optical paths of two light beams on adjacent optical paths among plural light beams deflected by one deflection face among the plural deflection faces, an optical path of one light beam among plural light beams deflected by a deflection face other than one deflection face described above among the plural deflection faces is located.

Furthermore, in the above-mentioned first, second, and third variation examples, a gap between centers of two adjacent light emission regions (light emission center gap) is twice a width of each light emission region in a direction of a Z-axis but is not limited thereto, wherein, essentially, it may only be necessary to be an even multiple thereof. In such a case, for example, it may be possible to arrange one coupling lens in such a manner that an optical axis thereof is located at a center between centers of two adjacent light emission regions, and as a result, it may be possible to emit two laser light beams separated in a direction of a Z-axis from two light emission regions, at output angles of $-\theta$ and $\theta$, respectively, via the coupling lens.

In either case, in a distance measuring device according to an embodiment of the present invention, it may be possible to (alternately) deflect laser light beams from a light source device at different timings due to plural deflection mirrors, and hence, it may be sufficient that the number of a light-receiving element(s) is less than or equal to the number of a laser light beam(s) on optical paths separated in a direction of a Z-axis from a light source device.

In each of the above-mentioned embodiments or each of the variation examples, a pulse waveform as a waveform of a time-modulated laser light beam is used in such a manner that light emission for a very short time period (several nanoseconds (nsec)-100 nanoseconds (nsec)) is repeated at a constant time interval, but an intensity-modulated laser light beam may be emitted by providing a light source with an intensity modulation such as a sine wave or a triangular wave.

In each of the above-mentioned embodiments or each of the variation examples, a laser light beam is incident on one deflection face from a $-X$ direction but is not limited thereto, wherein incidence from, for example, a $+X$ direction, a $+Y$ direction, a $-Y$ direction, etc., may be allowed, and essentially, incidence from an arbitrary direction around the rotation axis 22 may only be necessary. Additionally, a position of a light-receiving part may be changed depending on a direction of incidence or at least one optical member for guiding light from one reflection mirror to a condenser lens (or condenser mirror) may be provided.

In each of the above-mentioned embodiments or each of the variation examples, optical paths of laser light beams from two light-emitting parts (or light emission regions) of a light source device are mutually non-parallel but may be mutually parallel. Specifically, it may only be necessary that directions of emission of two light-emitting parts are parallel so as to increase a gap between the two light-emitting parts or an optical path of a laser light beam from at least one light-emitting part is shifted toward a direction as departing from an optical path of another laser light beam.

In each of the above-mentioned embodiments or each of the variation examples, four irradiation areas on an object do not overlap mutually but respective irradiation areas may overlap mutually in order to prevent a lack of measurement.

In each of the above-mentioned embodiments or each of the variation examples, it may be preferable that a width of each irradiation range in a vertical direction is constant inside a desired scanning range in a horizontal direction, but a width of an irradiation area in a vertical direction may be changed with a change of an output angle in a horizontal direction outside a desired scanning range in a horizontal direction.

In each of the above-mentioned embodiments or each of the variation examples (however, except the third variation example (part 2)), optical paths of two light beams from a light source device are separated in only a direction of a Z-axis, wherein, essentially, it may only be necessary to be separated in at least a direction of a Z-axis.

In each of the above-mentioned embodiments or each of the variation examples, a light source device may include an edge-emitting laser or a surface-emitting laser but may include another laser.

A configuration of a light source device in a distance measuring device according to an embodiment of the present invention is not limited to a configuration provided in each of the above-mentioned embodiments or each of the variation examples, but it may be possible to be modified appropriately.

In each of the above-mentioned embodiments or each of the variation examples, each deflection face is arranged at a +Z side of a corresponding reflection face but may be arranged at a −Z side thereof.

In each of the above-mentioned embodiments or each of the variation examples, a deflector or a reflector (or a deflection reflector) is fixed on the rotation axis 22 to be rotationally driven around an axis line parallel to a Z-axis but is not limited thereto, wherein, for example, an integrated deflector and reflector or a deflection reflector may be provided on a fixed axis with an axis line parallel to a Z-axis, rotatably around an axis of such a fixed axis. However, it may be necessary to join a deflector and a reflector via a joining member in order to integrate a deflector and a reflector.

In each of the above-mentioned embodiments, spread angles of laser light beams LB1 and LB2 emitted from a light source device are equal but may be mutually different.

APPENDIX

An Illustrative Embodiment(s) of a Distance Measuring Device

At least one illustrative embodiment of the present invention may relate to a distance measuring device, more particularly, may relate to a distance measuring device for irradiating an object with light and receiving reflected light therefrom, so as to measure a distance from the object.

An object of at least one illustrative embodiment of the present invention may be to provide a distance measuring device capable of measuring distances from plural places on a surface of an object for a short time while a cost increase is suppressed due to a simple configuration thereof.

At least one illustrative embodiment of the present invention may be a distance measuring device for irradiating an object with light and receiving reflected light therefrom so as to measure a distance from the object, wherein the distance measuring device includes a light source device having at least one light-emitting part, a deflection part being provided rotatably around a predetermined axis line and having plural deflection faces for reflecting light from the light source device toward the object, a reflection part being provided rotatably around the axis line and integrally with the deflection part and having plural reflection faces being provided to correspond to the plural deflection faces individually and reflecting a portion of light reflected from a corresponding deflection face and reflected from the object, and a light-receiving part having at least one light-receiving element for receiving light reflected from the reflection part, wherein respective inclination angles of the plural deflection faces with respect to the axis line are mutually different.

Illustrative Embodiment (1) is a distance measuring device for irradiating an object with light and receiving reflected light therefrom so as to measure a distance from the object, wherein the distance measuring device is characterized by including a light source device having at least one light-emitting part, a deflection part being provided rotatably around a predetermined axis line and having plural deflection faces for reflecting light from the light source device toward the object, a reflection part being provided rotatably around the axis line and integrally with the deflection part and having plural reflection faces being provided to correspond to the plural deflection faces individually and reflecting a portion of light reflected from a corresponding deflection face and reflected from the object, and a light-receiving part having at least one light-receiving element for receiving light reflected from the reflection part, wherein respective inclination angles of the plural deflection faces with respect to the axis line are mutually different.

Illustrative Embodiment (2) is the distance measuring device as described in Illustrative Embodiment (1), characterized in that the light source device emits plural light beams on optical paths separated mutually with respect to at least a direction parallel to the axis line and the number of the at least one light receiving element is less than or equal to the number of the plural light beams.

Illustrative Embodiment (3) is the distance measuring device as described in Illustrative Embodiment (2), characterized in that spread angles of respective plural light beams with respect to a direction parallel to the axis line are mutually equal, wherein a spread angle of a region between optical paths of two light beams on adjacent optical paths among the plural light beams is an integral multiple of the spread angles, wherein the inclination angles of the plural deflection faces are set to locate, in a region between optical paths of two light beams on adjacent optical paths among the plural light beams reflected from one deflection face among the plural deflection faces, an optical path of one light beam among the plural light beams reflected from a deflection face other than the one deflection face among the plural deflection faces.

Illustrative Embodiment (4) is the distance measuring device as described in any one of Illustrative Embodiments (1)-(3), characterized in that the at least one light-emitting part is plural light-emitting parts for each emitting pulsed light and timings of light emission of the plural light-emitting parts are mutually different.

Illustrative Embodiment (5) is the distance measuring device as described in Illustrative Embodiment (4), characterized in that a time difference between timings of light emission of two light-emitting parts provided to emit light consecutively among the plural light-emitting parts is set at 3 microseconds (μs) or greater and 100 microseconds (μs) or less.

Illustrative Embodiment (6) is the distance measuring device as described in Illustrative Embodiment (4) or (5), characterized in that the plural light-emitting parts are arranged to be juxtaposed in a direction parallel to the axis line, wherein lengths of respective light emission regions of the plural light-emitting parts with respect to a direction parallel to the axis line are mutually equal, wherein a distance between centers of two adjacent light emission regions with respect to a direction parallel to the axis line is an even multiple of lengths of the light emission regions with respect to a direction parallel to the axis line.

Illustrative Embodiment (7) is the distance measuring device as described in Illustrative Embodiment (6), characterized in that the light source has a laminate provided by laminating plural layers including a layer having the plural light emission regions, wherein the plural light emission regions are mutually separated in the layer having the plural light emission regions.

Illustrative Embodiment (8) is the distance measuring device as described in any one of Illustrative Embodiments (4)-(7), characterized by further including plural coupling lenses being arranged on respective optical paths of the plural light beams between the plural light-emitting parts and the deflection part and having respective optical axes orthogonal to the axis line, wherein the plural light-emitting parts are arranged in such a manner that respective center lines extending in directions of emission thereof are orthogonal to the axis line and are separated in a direction parallel to the axis line, wherein plural center lines of the plural light-emitting parts are located between optical axes of two coupling lenses located at one side and another side in a direction parallel to the axis line among the plural coupling lenses.

Illustrative Embodiment (9) is the distance measuring device as described in any one of Illustrative Embodiments (4)-(7), characterized by further including plural coupling lenses arranged on respective optical paths of the plural light beams between the plural light-emitting parts and the deflection part, wherein the plural light-emitting parts are arranged in such a manner that respective center lines thereof are tilted at different angles with respect to a direction orthogonal to the axis line, wherein respective center lines of the plural light-emitting parts are parallel to optical axes of corresponding coupling lenses.

Illustrative Embodiment (10) is the distance measuring device as described in any one of Illustrative Embodiments (4)-(9), characterized in that the light source device is provided in such a manner that the plural light-emitting parts have an array of one-dimensionally arrayed surface-emitting lasers.

Illustrative Embodiment (11) is the distance measuring device as described in Illustrative Embodiment (10), characterized in that a direction of the one-dimensional array is tilted with respect to a direction parallel to the axis line.

Illustrative Embodiment (12) is the distance measuring device as described in any one of Illustrative Embodiments (1)-(11), characterized in that respective inclination angles of the plural deflection faces are different depending on a position of light incidence with respect to a direction orthogonal to the axis line along the deflection faces.

Illustrative Embodiment (13) is the distance measuring device as described in any one of Illustrative Embodiments (1)-(12), characterized in that the plural deflection faces are integrated with corresponding plural reflection faces.

Illustrative Embodiment (14) is the distance measuring device as described in any one of Illustrative Embodiments (1)-(13), characterized in that the light-receiving part further includes a condenser mirror for reflecting toward the at least one light-receiving element and condensing onto the light-receiving element, respective light beams reflected from the plural reflection faces.

According to at least one illustrative embodiment of the present invention, it may be possible to measure distances from plural places on a surface of an object for a short time while a cost increase is suppressed due to a simple configuration.

Although the illustrative embodiments and specific examples of the present invention have been described with reference to the accompanying drawings, the present invention is not limited to any of the illustrative embodiments and specific examples and the illustrative embodiments and specific examples may be altered, modified, or combined without departing from the scope of the present invention.

The present application claims the benefit of its priority based on Japanese patent application No. 2012-035839 filed on Feb. 22, 2012, the entire content of which is hereby incorporated by reference herein.

What is claimed is:

1. A distance measuring device configured to irradiate an object with light and receive reflected light therefrom to measure a distance from the object, comprising
a light source device having at least one light-emitting part,
a deflection part being provided rotatably around a predetermined axis line and having plural deflection faces configured to reflect light from the light source device toward the object,
a reflection part being provided rotatably around the axis line and integrally with the deflection part and having plural reflection faces being provided to correspond to the plural deflection faces individually and reflecting a portion of light reflected from a corresponding deflection face and reflected from the object, and
a light-receiving part having at least one light-receiving element configured to receive light reflected from the reflection part,
wherein respective inclination angles of the plural deflection faces with respect to the axis line are mutually different,
wherein the light source device emits plural light beams on optical paths separated mutually with respect to at least a direction parallel to the axis line and the number of the at least one light receiving element is less than or equal to the number of the plural light beams, and
wherein the inclination angles of the plural deflection faces are set to locate, in a region between optical paths of two light beams on adjacent optical paths among the plural light beams reflected from one deflection face among the plural deflection faces, an optical path of one light beam among the plural light beams reflected from a deflection face other than the one deflection face among the plural deflection faces.

2. The distance measuring device as claimed in claim 1, wherein spread angles of respective plural light beams with respect to a direction parallel to the axis line are mutually equal, and
wherein a spread angle of a region between optical paths of two light beams on adjacent optical paths among the plural light beams is an integral multiple of the spread angles.

3. The distance measuring device as claimed in claim 1, wherein the at least one light-emitting part is plural light-emitting parts configured to each emit pulsed light and timings of light emission of the plural light-emitting parts are mutually different.

4. The distance measuring device as claimed in claim 3, wherein a time difference between timings of light emission of two light-emitting parts configured to emit light consecutively among the plural light-emitting parts is set at 3 microseconds or greater and 100 microseconds or less.

5. The distance measuring device as claimed in claim 3, wherein the plural light-emitting parts are arranged to be juxtaposed in a direction parallel to the axis line,
wherein lengths of respective light emission regions of the plural light-emitting parts with respect to a direction parallel to the axis line are mutually equal, and
wherein a distance between centers of two adjacent light emission regions with respect to a direction parallel to the axis line is an even multiple of lengths of the light emission regions with respect to a direction parallel to the axis line.

6. The distance measuring device as claimed in claim 5, wherein the light source includes a laminate provided by laminating plural layers including a layer having the plural light emission regions, wherein the plural light emission regions are mutually separated in the layer having the plural light emission regions.

7. The distance measuring device as claimed in claim 3, further comprising
plural coupling lenses being arranged on respective optical paths of the plural light beams between the plural light-emitting parts and the deflection part and having respective optical axes orthogonal to the axis line,
wherein the plural light-emitting parts are arranged in such a manner that respective center lines extending in directions of emission thereof are orthogonal to the axis line and are separated in a direction parallel to the axis line, and wherein plural center lines of the plural light-emitting parts are located between optical axes of two coupling lenses located at one side and another side in a direction parallel to the axis line among the plural coupling lenses.

8. The distance measuring device as claimed in claim 3, further comprising plural coupling lenses arranged on respective optical paths of the plural light beams between the plural light-emitting parts and the deflection part, wherein the plural light-emitting parts are arranged in such a manner that respective center lines thereof are tilted at different angles with respect to a direction orthogonal to the axis line, and wherein respective center lines of the plural light-emitting parts are parallel to optical axes of corresponding coupling lenses.

9. The distance measuring device as claimed in claim 3, wherein the light source device is provided in such a manner that the plural light-emitting parts include an array of one-dimensionally arrayed surface-emitting lasers.

10. The distance measuring device as claimed in claim 9, wherein a direction of the one-dimensional array is tilted with respect to a direction parallel to the axis line.

11. The distance measuring device as claimed in claim 1, wherein respective inclination angles of the plural deflection faces are different depending on a position of light incidence with respect to a direction orthogonal to the axis line along the deflection faces.

12. The distance measuring device as claimed in claim 1, wherein the plural deflection faces are integrated with corresponding plural reflection faces.

13. The distance measuring device as claimed in claim 1, wherein the light-receiving part further includes a condenser mirror configured to reflect toward the at least one light-receiving element and condense onto the light-receiving element, respective light beams reflected from the plural reflection faces.

14. The distance measuring device as claimed in claim 1, wherein the light-receiving part includes a plurality of light-receiving elements each configured to receive light reflected from the reflection part.

\* \* \* \* \*